US011140754B2

(12) United States Patent
Lim et al.

(10) Patent No.: US 11,140,754 B2
(45) Date of Patent: Oct. 5, 2021

(54) COOKING APPARATUS

(71) Applicant: Samsung Electronics Co., Ltd, Suwon-si (KR)

(72) Inventors: Gyu Sik Lim, Suwon-si (KR); Hyun Shik Shin, Suwon-si (KR); Jin Ho Jeong, Seoul (KR); Hong Man Chang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 15/776,758

(22) PCT Filed: Nov. 15, 2016

(86) PCT No.: PCT/KR2016/013145
§ 371 (c)(1),
(2) Date: May 16, 2018

(87) PCT Pub. No.: WO2017/086678
PCT Pub. Date: May 26, 2017

(65) Prior Publication Data
US 2018/0352615 A1 Dec. 6, 2018

(30) Foreign Application Priority Data
Nov. 16, 2015 (KR) .......................... 10-2015-0160682

(51) Int. Cl.
*H05B 6/68* (2006.01)
*F24C 7/02* (2006.01)
(Continued)

(52) U.S. Cl.
CPC ................ *H05B 6/687* (2013.01); *A23L 5/15* (2016.08); *A23L 5/34* (2016.08); *A47J 27/00* (2013.01);
(Continued)

(58) Field of Classification Search
CPC . A47J 27/004; A47J 36/32; A23L 5/15; A23L 5/34; A23L 2002/00
(Continued)

(56) References Cited
U.S. PATENT DOCUMENTS 4,613,739 A * 9/1986 Richards ............. H05B 6/6452
219/506
5,783,807 A * 7/1998 Uehashi ................ H05B 6/642
219/685
(Continued)

FOREIGN PATENT DOCUMENTS

| CN | 1249894 A | 4/2000 |
| CN | 1891115 A | 1/2007 |

(Continued)

OTHER PUBLICATIONS

Office Action dated Apr. 2, 2019 in connection with Chinese Patent Application No. 201680066912.6, 23 pages.
(Continued)

*Primary Examiner* — Thien S Tran

(57) ABSTRACT

Disclosed is a cooking apparatus for providing a cooking vessel suitable for a simmer cooking function. A cooking apparatus of the present invention includes a cooking room; a cooking vessel accommodated in the cooking room, and including a main body, and a heating element attached on a bottom of the main body and configured to be heated by microwaves to heat the main body; a microwave heater configured to radiate microwaves to the cooking vessel; an input device configured to receive a simmer cooking command; and a controller configured to repeatedly perform a process of turning on the microwave heater for a first time period, when the simmer cooking command is received through the input device, and turning off the microwave heater for a second time period when the first time period elapses, for a cooking time period, and configured to per-
(Continued)

form a keeping-warm process when a door does not open in a third time period after the cooking time period elapses.

18 Claims, 20 Drawing Sheets

(51) Int. Cl.
  *F24C 13/00* (2006.01)
  *F24C 7/08* (2006.01)
  *A47J 27/00* (2006.01)
  *H05B 6/64* (2006.01)
  *A23L 5/30* (2016.01)
  *A23L 5/10* (2016.01)
  *A47J 36/32* (2006.01)

(52) U.S. Cl.
  CPC ............ *A47J 27/004* (2013.01); *A47J 36/32* (2013.01); *F24C 7/02* (2013.01); *F24C 7/08* (2013.01); *F24C 13/00* (2013.01); *H05B 6/6476* (2013.01); *H05B 6/6482* (2013.01); *H05B 6/6494* (2013.01); *A23V 2002/00* (2013.01)

(58) Field of Classification Search
  USPC ................ 219/439, 494, 506, 703, 711, 720
  See application file for complete search history.

(56) References Cited

U.S. PATENT DOCUMENTS

| | | | |
|---|---|---|---|
| 6,150,637 A | 11/2000 | Arroubi et al. | |
| 9,035,224 B2 | 5/2015 | Lim et al. | |
| 2003/0141295 A1* | 7/2003 | Ishikawa | H05B 6/688 |
| | | | 219/697 |
| 2004/0094539 A1 | 5/2004 | Kim | |
| 2013/0284728 A1* | 10/2013 | Moon | H05B 6/686 |
| | | | 219/748 |
| 2014/0061189 A1* | 3/2014 | Lim | H05B 6/6408 |
| | | | 219/681 |
| 2015/0313406 A1* | 11/2015 | Park | H05B 6/6408 |
| | | | 219/730 |

FOREIGN PATENT DOCUMENTS

| | | | |
|---|---|---|---|
| CN | 103672993 A | | 3/2014 |
| EP | 0078325 A1 | | 5/1983 |
| EP | 1427256 A2 | | 6/2004 |
| EP | 2704526 A1 | | 3/2014 |
| JP | 10-151068 A | | 6/1998 |
| KR | 10-0149870 B1 | | 3/1999 |
| KR | 20-1999-0010215 U | | 3/1999 |
| KR | 1999-010215 | * | 3/1999 |
| KR | 0149870 | * | 3/1999 |
| KR | 10-0205928 B1 | | 7/1999 |
| KR | 10-2014-0030023 A | | 3/2014 |

OTHER PUBLICATIONS

International Search Report dated Feb. 23, 2017 in connection with International Patent Application No. PCT/KR2016/013145.
Written Opinion of the International Searching Authority dated Feb. 23, 2017 in connection with International Patent Application No. PCT/KR2016/013145.
European Patent Office, "Supplementary European Search Report," Application No. EP 16866630.3, dated Oct. 19, 2018, 9 pages.
The Second Office Action in connection with Chinese Application No. 201680066912.6 dated Dec. 13, 2019, 22 pages.
The Fourth Office Action dated Oct. 9, 2020 in connection with Chinese Application No. 201680066912.6, 21 pages.

* cited by examiner

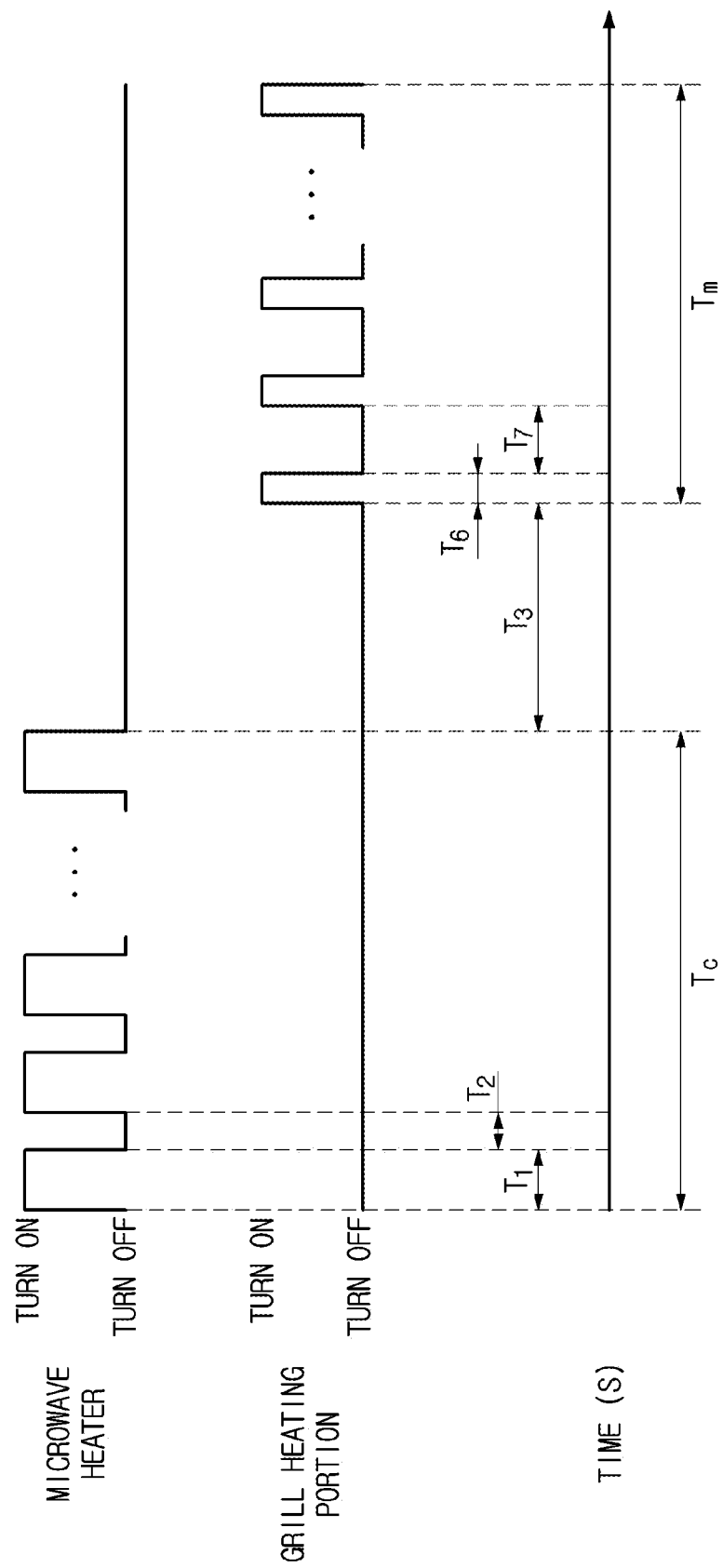

COOKING APPARATUS

CROSS-REFERENCE TO RELATED APPLICATION(S) AND CLAIM OF PRIORITY

This application is a 371 of International Application No. PCT/KR2016/013145 filed Nov. 15, 2016, which claims priority to Korean Patent Application No. 10-2015-0160682 filed Nov. 16, 2015, the disclosures of which are herein incorporated by reference in their entirety.

TECHNICAL FIELD

The present disclosure relates to a cooking apparatus.

BACKGROUND

In general, a microwave is an apparatus for supplying microwaves to the inside of a cooking room to cook a cooking material.

The latest microwave includes a grill apparatus for supplying radiant heat, a convection apparatus for supplying convection heat, etc., in addition to a microwave heating apparatus for supplying microwaves, to heat a cooking material by various methods. Also, the microwave provides a function of cooking a cooking material automatically according to the kind of the cooking material using various heating sources. That is, the microwave provides functions of warning a cooking material up using microwaves, of baking a cooking material using the grill apparatus, and of cooking a cooking material using the convection apparatus.

However, the microwave cannot implement cooking methods, such as porridge, stew, soup, hard-boiled food, and sauce, which need to use cooking tools, such as a pot or a caldron.

SUMMARY

An embodiment of the present disclosure is to provide a cooking vessel suitable for a simmer cooking function.

Another embodiment of the present disclosure is to provide a cooking apparatus providing a simmer cooking function.

According to an embodiment of the present disclosure, there is provided a cooking apparatus including: a cooking room in which a cooking vessel is accommodated; a microwave heater configured to radiate microwaves to the cooking vessel; an input device configured to receive a simmer cooking command; and a controller configured to repeatedly perform a process of turning on the microwave heater for a first time period, when the simmer cooking command is received through the input device, and turning off the microwave heater for a second time period when the first time period elapses, for a cooking time period, and configured to perform a keeping-warm process when a door does not open in a third time period after the cooking time period elapses.

The input device may include a simmer cooking button configured to receive a simmer cooking command from a user.

The cooking apparatus may further include a display configured to display information related to cooking, wherein if the simmer cooking command is received, the display may display a first object informing that simmer cooking is being performed, for the cooking time period, and if the door does not open in the third time period after the cooking time period elapses, the display may display a second object informing that the keeping-warm process is being performed.

The first object and the second object may include an icon or text.

The cooking apparatus may further include a speaker configured to output sound related to cooking, wherein when the cooking time period elapses, the speaker may output first sound informing that the cooking time period has elapsed, and when the keeping-warm time period elapses, the speaker may output second sound informing that the keeping-warm time period has elapsed.

The first sound and the second sound may include pre-stored different signal sound or voices.

The controller may drive, while the keeping-warm process is being performed, the microwave heater with an output power that is lower than an output power of the microwave heater during the cooking process.

If the door does not open in the third time period after the cooking time period elapses, the controller may repeatedly perform a process of turning on the microwave heater for a fourth time period and turning off the microwave heater for a fifth time period when the fourth time period elapses, for a keeping-warm time period.

The cooking apparatus may further include a grill heating portion configured to supply radiant heat to the cooking vessel, wherein if the door does not open in the third time period after the cooking time period elapses, the controller may repeatedly perform a process of turning on the grill heating portion for a sixth time period and turning off the grill heating portion for a seventh time period when the sixth time period elapses, for a keeping-warm time period.

The cooking vessel may include a main body, a heating element attached on a bottom of the main body and configured to be heated by microwaves to heat the main body, and a lid configured to cover the main body.

The heating element may be made of a ferrite-rubber compound.

The lid may be made of glass to pass microwaves through.

According to another embodiment of the present disclosure, there is provided a method of controlling a cooking apparatus, the cooking apparatus including a cooking room configured to accommodate a cooking vessel, a microwave heater configured to radiate microwaves to the cooking vessel, and an input device configured to receive a simmer cooking command, the method including: turning on the microwave heater for a first time period, when the simmer cooking command is received through the input device; turning off the microwave heater for a second time period, when the first time period elapses; repeatedly performing a process of turning on and off the microwave heater for a cooking time period, and performing a keeping-warm process if a door does not open in a third time period after the cooking time period elapses.

The cooking apparatus may further include a display configured to display information related to cooking, wherein if the simmer cooking command is received through the input device, the display may display a first object informing that simmer cooking is being performed, for the cooking time period, and if the door does not open in the third time period after the cooking time period elapses, the display may display a second object informing that the keeping-warm process is being performed.

The cooking apparatus may further include a speaker configured to output sound related to cooking, wherein when the cooking time period elapses, wherein the speaker may output first sound informing that the cooking time period has elapsed, and when the keeping-warm time period elapses, the speaker may output second sound informing that the keeping-warm time period has elapsed.

The performing of the keeping-warm process may include, when the keeping-warm process is being performed, driving the microwave heater with an output power that is lower than an output power of the microwave heater during the cooking process.

The performing of the keeping-warm process may include: turning on the microwave heater for a fourth time period, if the door does not open in the third time period after the cooking time period elapses; turning off the microwave heater for a fifth time period, when the fourth time period elapses; and repeatedly performing a process of turning on and off the microwave heater, for a keeping-warm time period.

The cooking apparatus may further include a grill heating portion configured to supply radiant heat to the cooking vessel, wherein the performing of the keeping-warm process may include: turning on the grill heating portion for a sixth time period, if the door does not open in the third time period after the cooking time period elapses; turning off the grill heating portion for a seventh time period, when the sixth time period elapses; and repeatedly performing a process of turning on and off the grill heating portion, for a keeping-warm time period.

According to the disclosed embodiments, a cooking apparatus such as a microwave using microwaves can perform simmer or cooking using a pot.

BRIEF DESCRIPTION OF THE DRAWINGS

FIG. 9A is a graph showing time at which a microwave heater and a convection heating portion operate to perform a simmer cooking function of the cooking apparatus according to the other embodiment.

DETAILED DESCRIPTION

Hereinafter, embodiments of the present disclosure will be described in detail with reference to the accompanying drawings.

The embodiments can be applied to all kinds of cooking apparatuses using microwaves. The cooking apparatuses may include a microwave, a microwave oven, and a complex oven. Hereinafter, for convenience of description, a microwave will be described as an embodiment.

Figure 1A:
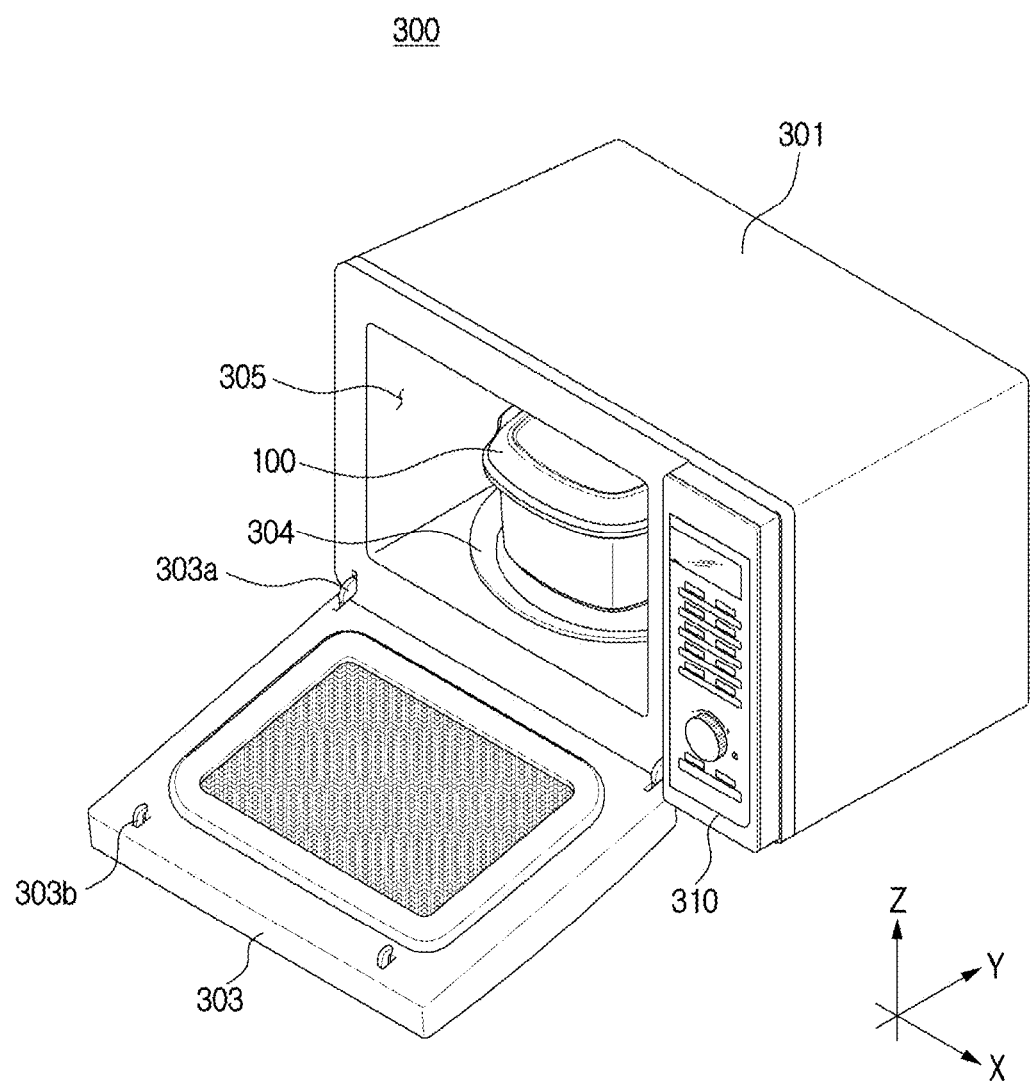
FIG. 1A shows an outer appearance of a cooking apparatus according to an embodiment.
Figure 1B:
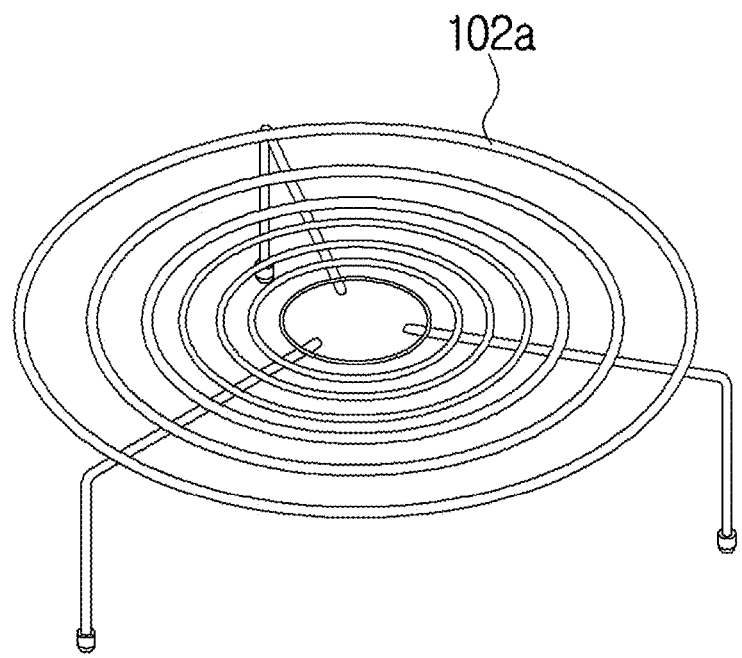
FIG. 1B shows racks of a cooking apparatus according to an embodiment.
Figure 1B:
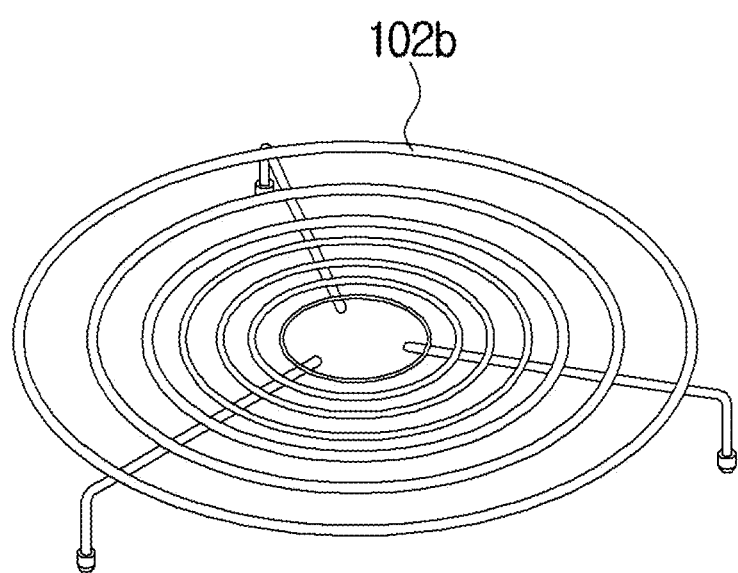
Figure 2:
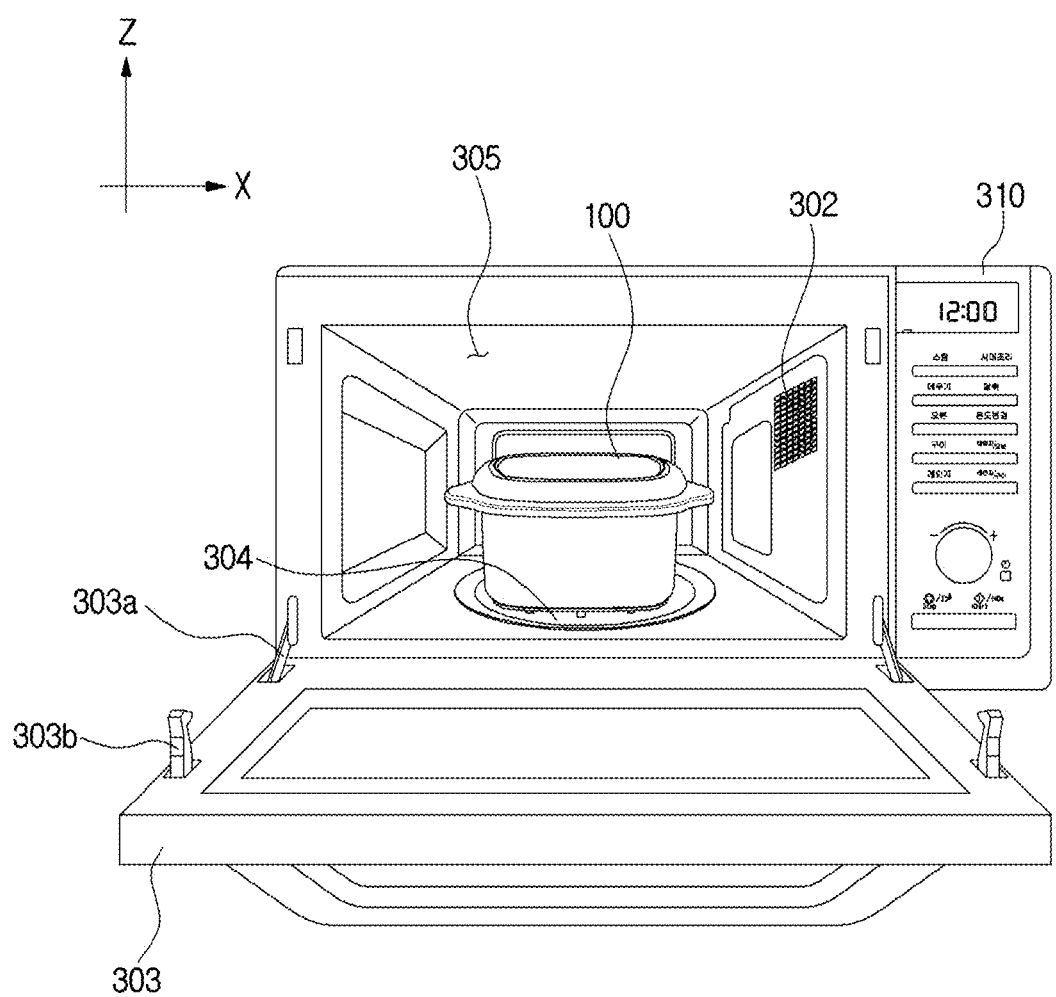
FIG. 2 shows the inside of the cooking apparatus shown in FIG. 1A.
Figure 3A:
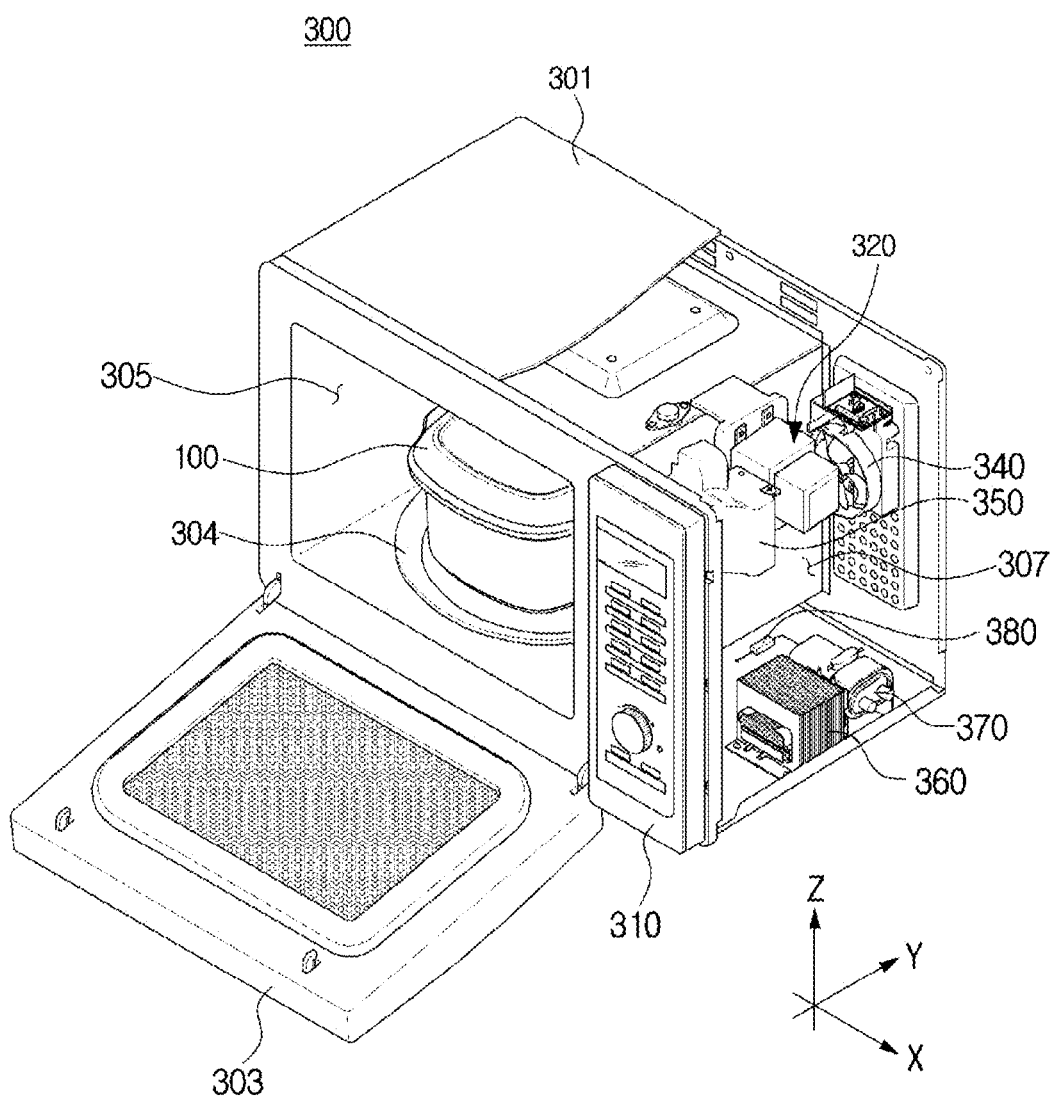
FIG. 3A shows a machine room of a cooking apparatus according to an embodiment, including a cooling fan and a microwave heater.
Figure 3B:
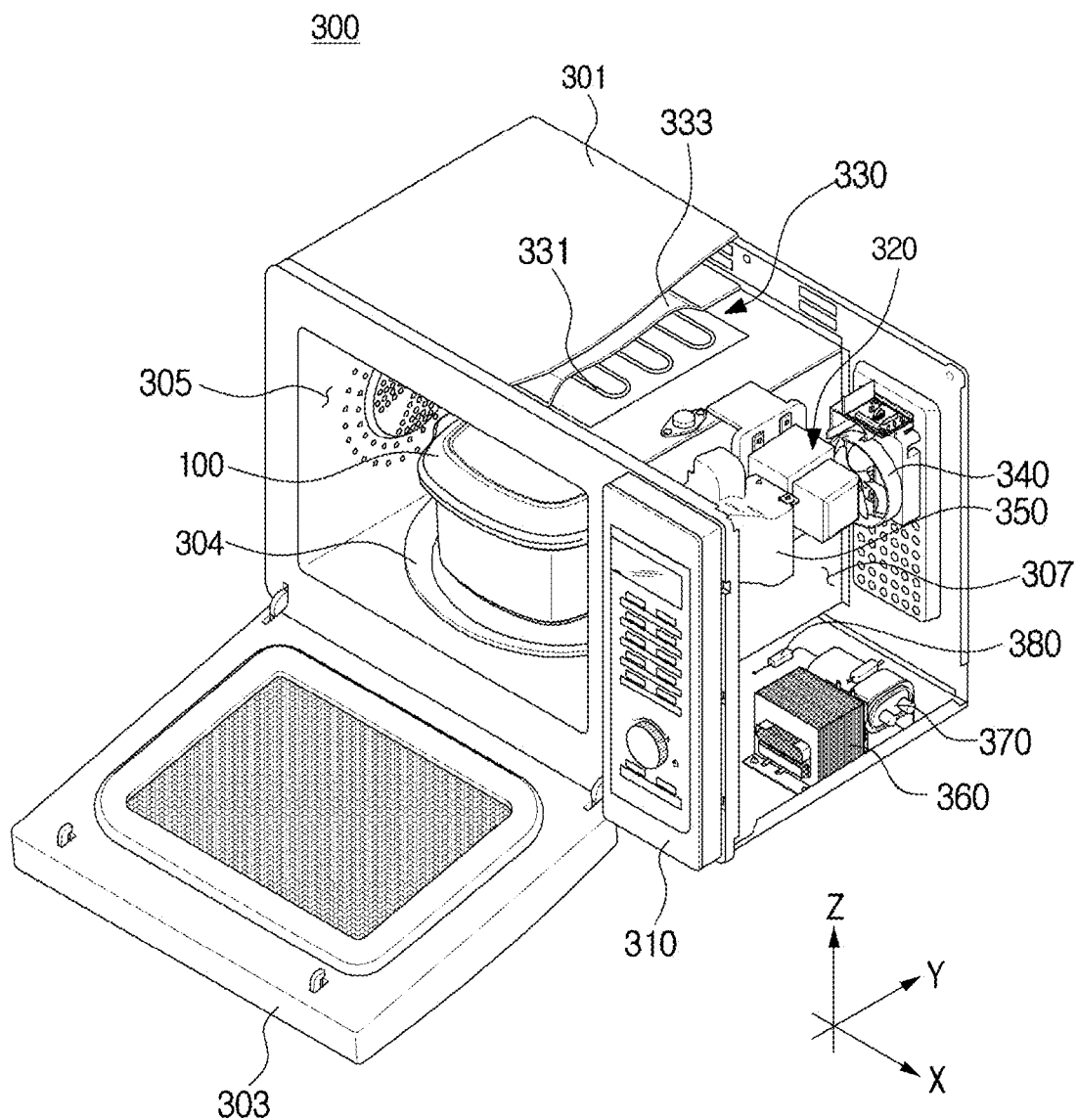
FIGS. 3B and 3C show a machine room of a cooking apparatus according to another embodiment, including a cooling fan, a microwave heater, a grill heater, and a convection heater.
Figure 3C:
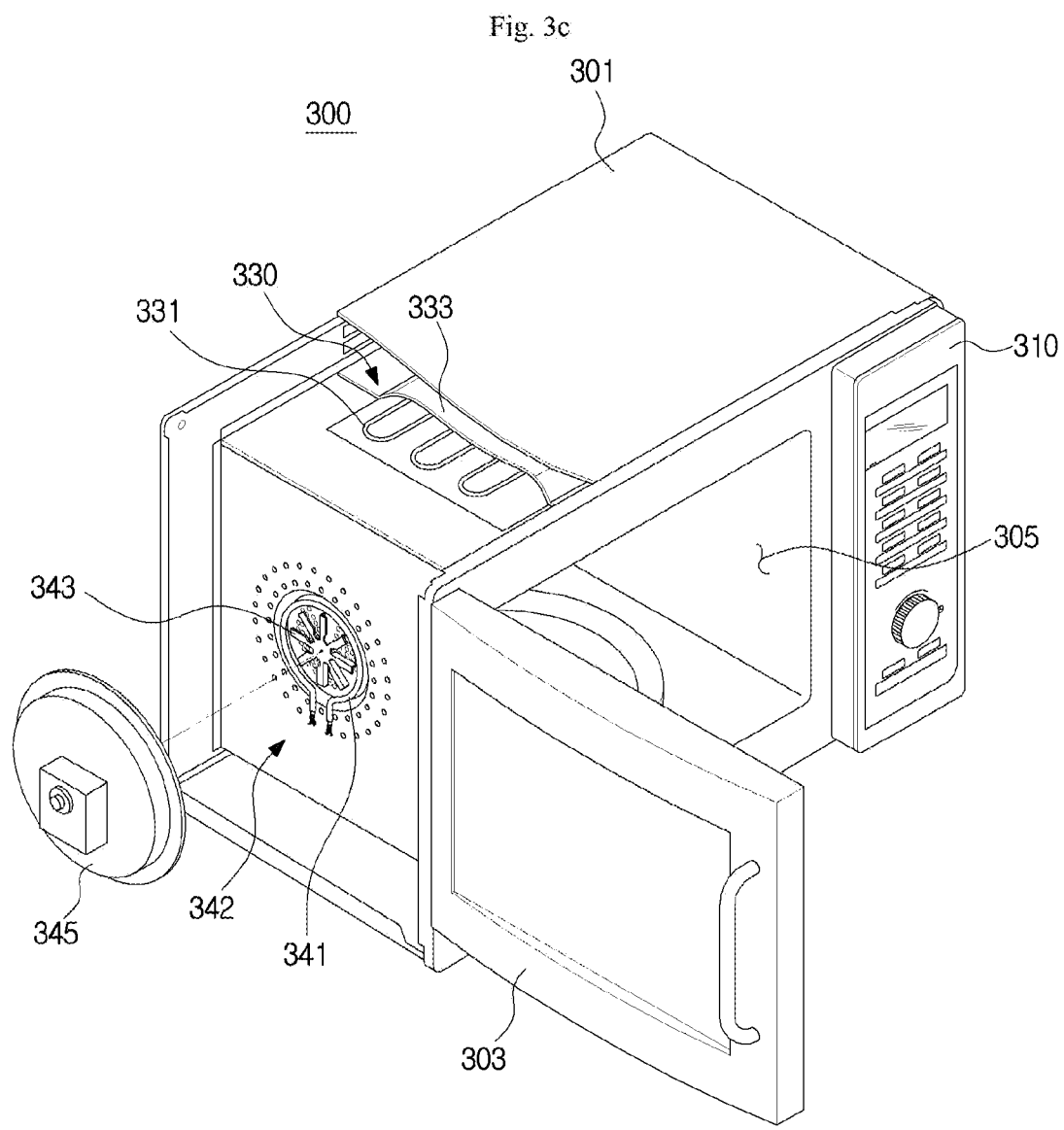
Figure 4:
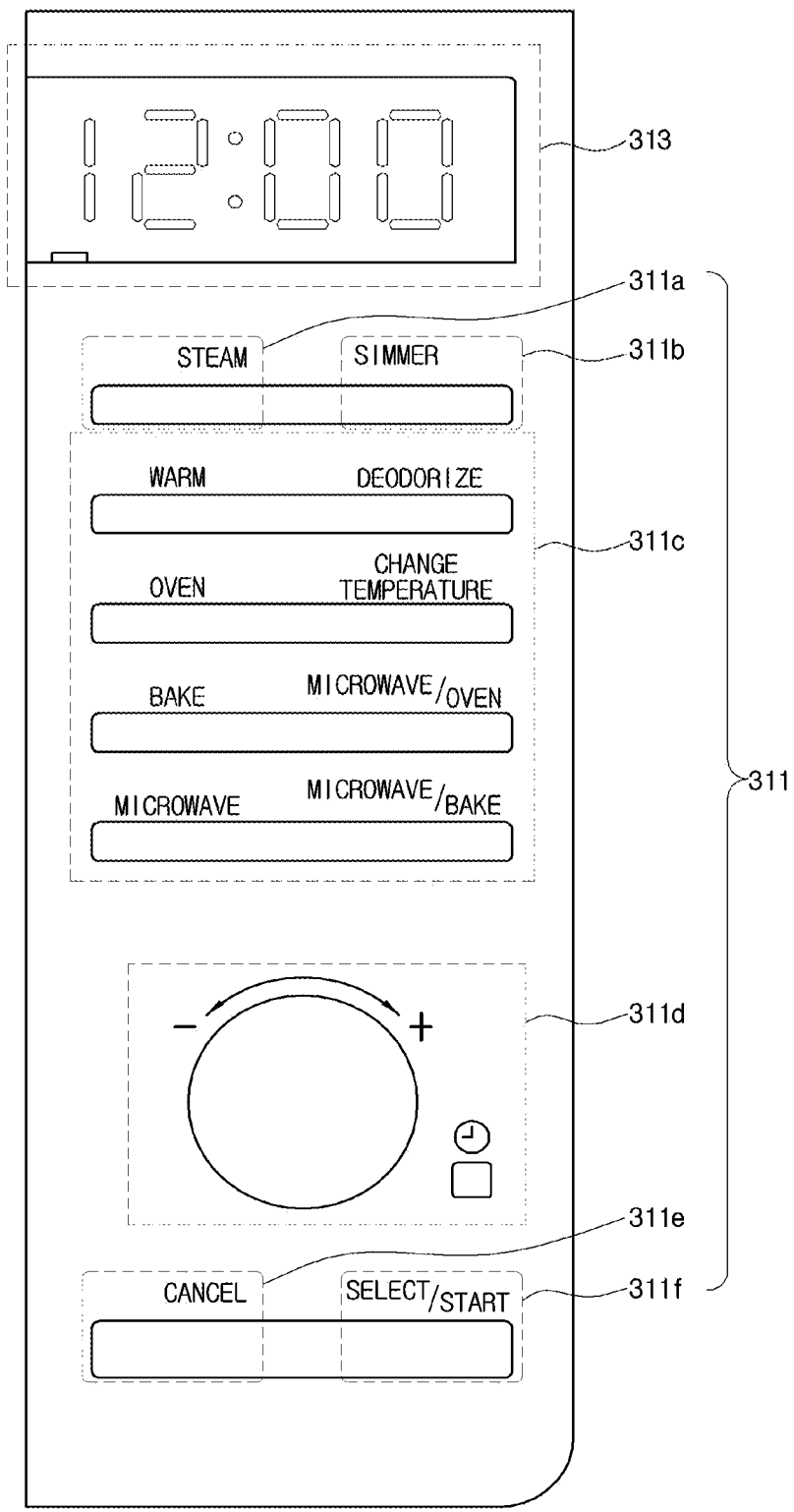
FIG. 4 shows a control panel of a cooking apparatus according to an embodiment.

FIG. 1A shows an outer appearance of a cooking apparatus according to an embodiment, FIG. 1B shows racks of a cooking apparatus according to an embodiment, and FIG. 2 shows the inside of the cooking apparatus shown in FIG. 1A. FIG. 3A shows a machine room of a cooking apparatus according to an embodiment, including a cooling fan and a microwave heater. FIGS. 3B and 3C show a machine room of a cooking apparatus according to another embodiment, including a cooling fan, a microwave heater, a grill heater, and a convection heater. FIG. 4 shows a control panel of a cooking apparatus according to an embodiment.

Referring to FIGS. 1A to 3A, a cooking apparatus 300 may include a housing 301 forming an outer appearance of the cooking apparatus 300, a cooking room 305 formed in the inside of the housing 301 and accommodating a cooking material to be cooked, a door 303 disposed in a front portion of the housing 301 and configured to open or close the cooking room 305, a machine room 307 which is disposed to the right of the cooking room 305 and in which a microwave heater 320, etc. are installed, and a control panel 310 configured to receive commands for operating the cooking apparatus 300 from a user.

Between the housing 301 and the cooking room 305, an insulator (not shown) may be provided to surround the cooking room 305. The insulator may insulate the cooking room 305 from the outside.

FIGS. 1A to 3A show a state in which a cooking vessel 100 for the cooking apparatus 300 is accommodated in the cooking room 305. The cooking vessel 100 according to an embodiment of the present disclosure may be used for simmer cooking, such as porridge, stew, soup, hard-boiled food, and sauce, for which a pot or a caldron is used. The cooking vessel 100 and a method for controlling the cooking apparatus 300 using the cooking vessel 100 will be described later.

The door 303 may be rotatably connected to the housing 301 through a hinge 303a formed at one edge. When the door 303 is closed, the door 303 may be fixed at the housing 301 through a latch 303b formed in the opposite side of the hinge 303a.

The door 303 may be rotatably attached at a front, lower portion of the housing 301 through the hinge 303a, as shown in FIGS. 1A and 2. However, a position at which the door 303 is attached on the housing 301 is not limited to the front, lower portion of the housing 301. For example, the door 303 may be rotatably attached at a front, left portion of the housing 301 through the hinge 303a.

Also, the cooking apparatus 300 may include a turntable 304 for rotating a cooking material in the inside of the cooking room 305, and further include a high rack 102a and a low rack 102*b*, as shown in FIG. 1B. The cooking vessel 100 which will be described later may be placed on the turntable 304 or on the high rack 102*a* or the low rack 102*b* to be accommodated in the cooking apparatus 300.

In the machine room 307 disposed to the right of the cooking room 305, a microwave heater 320 including a magnetron for radiating microwaves to the inside of the cooking room 305, a driver provided to drive the microwave heater 320 and including a high-voltage transformer 360, a high-voltage condenser 370, and a high-voltage diode 380, a cooling fan 340 for inhaling outdoor air to cool components installed in the inside of the machine room 307, and a guide duct 350 for guiding outdoor air entered by the cooling fan 340 to the cooking room 305.

The high-voltage transformer 360 may receive a common Alternating-Current (AC) voltage, and output a high voltage of 2000V or more. The high voltage output from the high-voltage transformer 360 may be doubled by the high-voltage condenser 370 and the high-voltage diode 380 to be maintained at about 4000V. The voltage doubled by the high-voltage condenser 370 and the high-voltage diode 380 may be supplied to the magnetron. The magnetron may generate microwaves having a frequency of 2.45 GHz, and radiate the microwaves to the inside of the cooking room 305 through an inner right wall of the cooking room 305. The microwaves radiated by the microwave heater 320 may penetrate the cooking material placed in the inside of the cooking room 305 to cook the cooking material inside.

The microwave heater 320 may adopt a fixed-output microwave heater for outputting microwaves of a maximum output power. The fixed-output microwave heater may radiate microwaves of various powers by changing a ratio of time for which microwaves are radiated to time for which no microwaves are radiated (for example, if a maximum output is 900 W, the fixed-output microwave heater can radiate microwaves of 600 W on average by repeatedly performing a process of driving the microwave heater 320 for 20 seconds and stopping the microwave heater 320 for 10 seconds). However, the microwave heater 320 may be implemented as a variable-output microwave heater that radiates microwaves of various powers directly by adopting an inverter as a driving circuit.

According to another embodiment, as shown in FIGS. 3B and 3C, the cooking apparatus 300 may further include a grill heating portion 330 for providing radiant heat to a cooking material placed in the cooking room 305, and a convection heating portion 342 for generating hot air to heat the cooking material. The grill heating portion 330 may be disposed in an upper space of the cooking room 305, and may include a grill heater 331 for radiating radiant heat and a reflective plate 333 for concentrating the radiated radiant heat at the inside of the cooking room 305. The grill heater 331 may be a halogen lamp for emitting strong radiant heat, a heating wire for radiating Joule's heat through electrical resistance, or the like.

The radiant heat radiated by the grill heater 331 may be radiated directly to the inside of the cooking room 305, or may be reflected on the reflective plate 333 and then radiated to the inside of the cooking room 305 to radiation-heat the cooking material placed in the inside of the cooking room 305.

The radiant heat provided by the grill heating portion 330 may harden the surface of the cooking material, like roasting.

The convection heating portion 342 may be disposed on an outer side of a left wall of the cooking room 305, and may include a convection heater 341 for generating hot wind for heating a cooking material, a convection circulating fan 343 for supplying heated air around the convection heater 341 to the inside of the cooking room 305, and a convection driving motor 345 for providing a rotatory force to the convection circulating fan 343.

The convection circulating fan 343 may inhale inside air of the cooking room 305 by rotating blades, and blow the air in the radial direction. The convection heater 341 may be disposed along the outer line of the convection circulating fan 343 in such a way to surround the convection circulating fan 343, to heat air blown by the convection circulating fan 343. The convection heater 341 may be a heating wire that generates Joule's heat by electrical resistance.

The convection circulating fan 343 may inhale inner air of the cooking room 305 to blow the inhaled air in the radial direction, and the convection heater 341 may heat the air blown by the convection circulating fan 343. The air heated by the convection heater 341 may be provided to the cooking room 305.

Meanwhile, the cooling fan 340 may blow outside air into the machine room 307 and the cooking room 305. In the rear portion of the cooking apparatus 300, an inlet hole though which outside air can enter may be formed, and the cooling fan 340 may be disposed in the inlet hole.

When the cooking apparatus 300 operates, heat may be generated in the microwave heater 320 or the high-voltage transformer 360, and accordingly, the inside temperature of the machine room 307 may rise. The cooling fan 340 may blow outside air into the machine room 307 to lower the temperature of the machine room 307.

The guide duct 350 may guide the outside air entered the machine room 307 by the cooling fan 340 to the cooking room 305. In a right wall of the cooking room 305, a plurality of holes 302 may be formed through which the air entered by the cooling fan 340 can pass. The guide duct 350 may be installed in the holes 302 formed in the right wall of the cooking room 305. The air entered the guide duct 350 may move to the cooking room 305 through the holes 302.

In the guide duct 350, a damper (not shown) may be installed to adjust entrance of air. The damper may open an air inlet of the guide duct 350 to make air enter the guide duct 350, or may close the air inlet of the guide duct 350 to prevent air from entering the guide duct 350.

The control panel 310 may be disposed at a front, right portion of the housing 301. The control panel 310 may include an input device 311 for receiving commands for operations of the cooking apparatus 300 from a user, and a display 313 for displaying operation states of the cooking apparatus 300.

The input device 311 may be disposed at a lower portion of the control panel 310, and receive various operation commands, such as a cooking start command, a cooking time setting command, a cooking cancel command, a cooking pause command, etc., from the user. The input device 311 may be a button type switch, a membrane switch, a dial, etc.

More specifically, the input device 311 may include a steam cooking button 311*a* for receiving a steam cooking command, a simmer cooking button 311*b* for receiving a simmer cooking command, a plurality of function selection buttons 311*c* for enabling the user to select any one heating method among microwave heating, grill heating, and convection heating, a dial 311*d* for enabling the user to set cooking time or to input a weight of a cooking material, a cancel button 311*e* for enabling the user to input a command for stopping the cooking apparatus 300, and a select/start button 311f for enabling the user to input a command for starting the cooking apparatus 300.

Also, the input device 311 may be configured such that the user can recognize the functions of the buttons by looking at characters written on the buttons, as shown in FIG. 4. Also, the input device 311 may be configured such that the user can intuitively recognize the functions of the buttons through figure designs or icons.

The display 313 may be positioned on an upper portion of the control panel 310 to display an operation state of the cooking apparatus 300, such as an output of the cooking apparatus 300, cooking time, etc., for the user. The display 313 may be implemented with a Liquid Crystal Display (LCD) panel or a Light Emitting Diode (LED) panel.

In the cooking apparatus 300 according to the current embodiment, the input device 311 is separated from the display 313. However, a Touch Screen Panel (TSP) in which the input device 311 and the display 313 are integrated may be used.

If a command is received through the simmer cooking button 311b, a plurality of pre-stored simmer cooking types may be displayed on the display 313 to enable the user to select one of the simmer cooking types. For example, simmer cooking types requiring boiling, such as Borsch, Cream Pumpkin soup, and Cream Mushroom soup, may be displayed on the display 313. The user may select his/her desired one from among the simmer cooking types displayed on the display 313 to perform the selected simmer cooking according to a cooking algorithm set to be suitable for the corresponding simmer cooking.

FIGS. 5A to 5D show a cooking vessel for a cooking apparatus, according to an embodiment.

The cooking vessel 100 according to an embodiment may include a vessel main body 110 for containing a cooking material, a lid 140 for covering the vessel main body 110, and a heating element 122 attached on a bottom of the vessel main body 110. Also, the cooking vessel 100 may include a tray 121 that can be installed in the inside of the vessel main body 110.

Figure 5A:
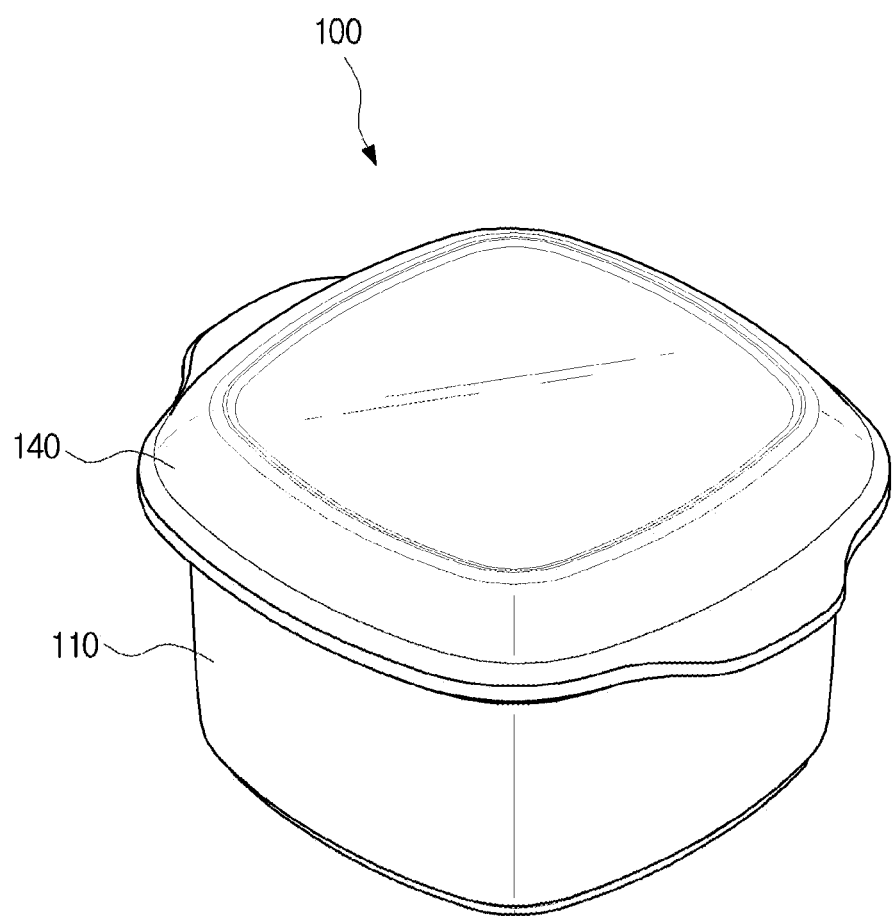
FIGS. 5A to 5D show a cooking vessel for a cooking apparatus, according to an embodiment.
Figure 5B:
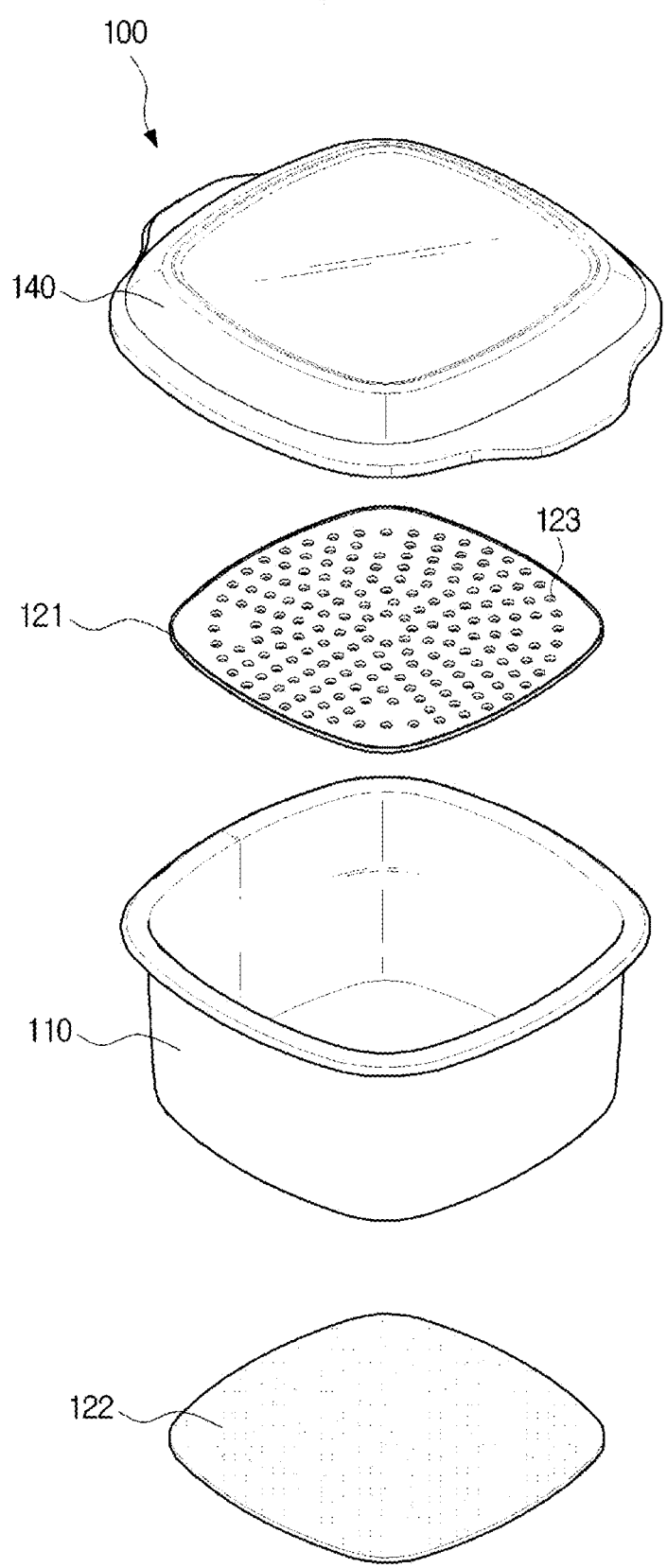
Figure 5C:
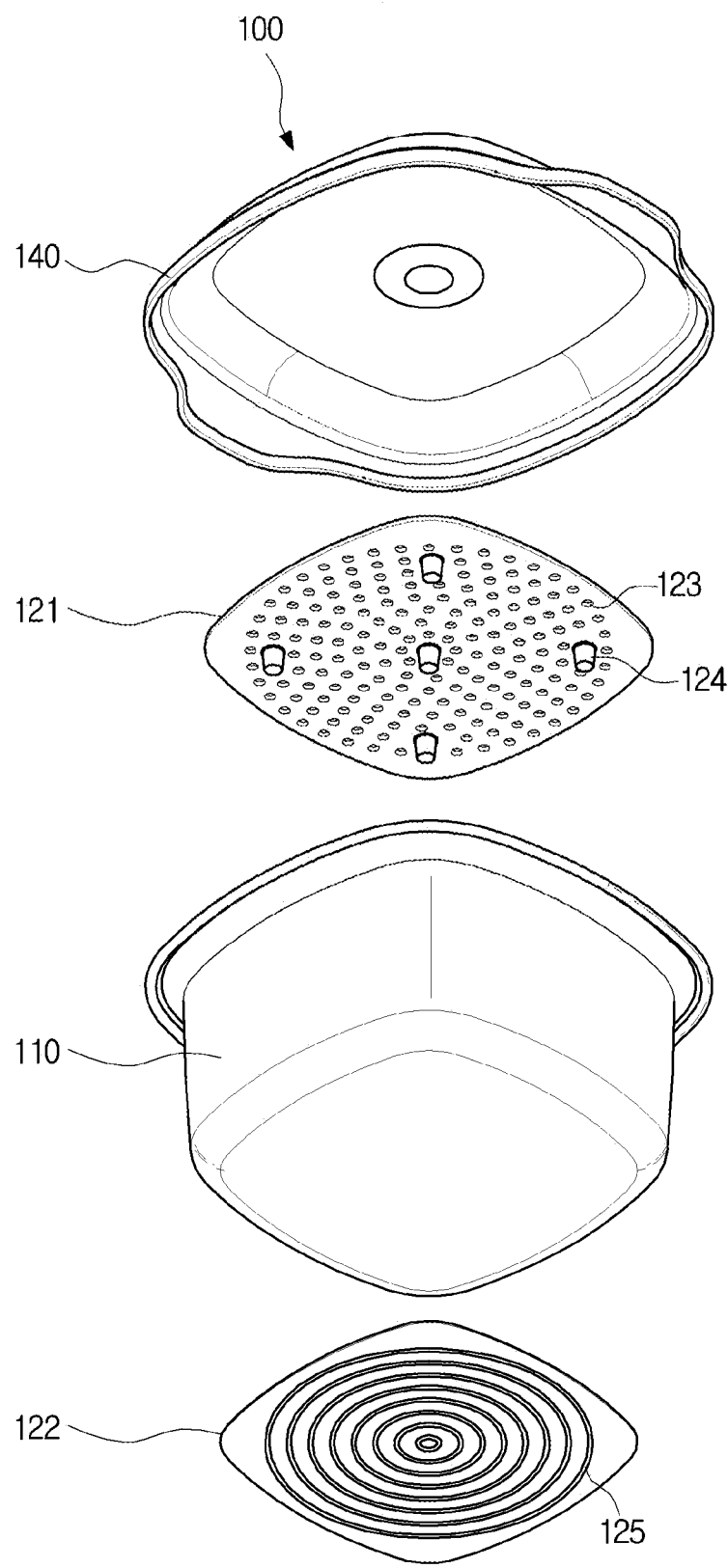
Figure 5D:
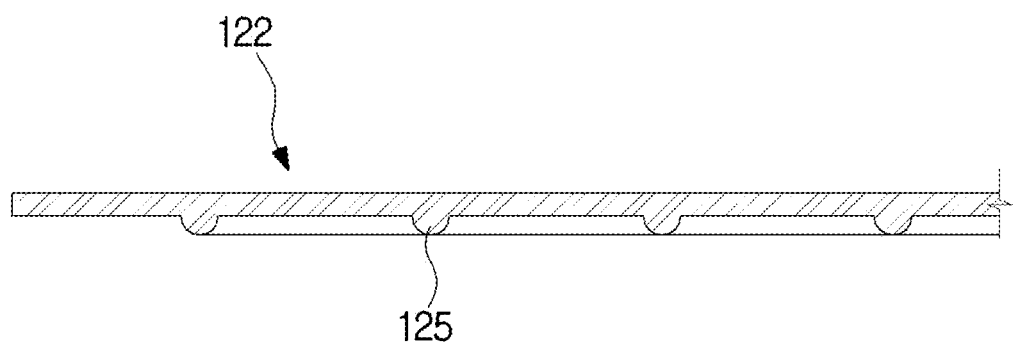
Figure 5E:
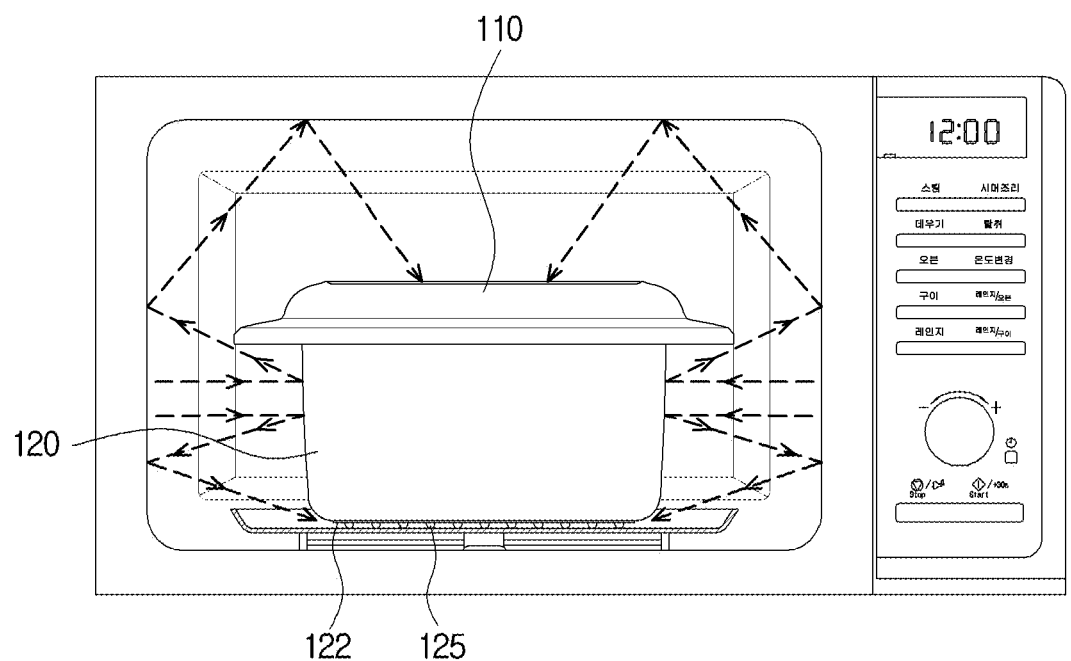
FIG. 5E shows a conceptual view of movement of high frequency during cooking through the cooking container for a cooking apparatus according to an embodiment.

The heating element 122 may be made of a ferrite-rubber compound. The ferrite-rubber compound may absorb microwaves radiated from the microwave heater 320 to emit heat, and transfer the heat to the vessel main body 110 on which the heating element 122 is attached. The vessel main body 110 may be made of aluminum having excellent thermal conductivity or an alloy containing aluminum in order to transfer heat transferred from the heating element 122 to a cooking material. Also, the vessel main body 110 may have a height of 600 mm or higher to be suitable for simmer cooking. The heating element 122 may include a protrusion 125 formed in the shape of a concentric circle on the bottom, as shown in FIGS. 5C and 5D. However, the protrusion 125 formed on the bottom of the heating element 122 may have a different shape, instead of a concentric circle. Due to the protrusion 125, a gap corresponding to the height of the protrusion 125 may be formed between the heating element 122 and a surface on which the cooking vessel 100 is put. If the cooking vessel 100 is put on the turntable 304 or the high/low rack 102a/102b, microwaves reflected from the vessel main body 110 made of a metal material may be absorbed in the heating element 122 through the gap formed by the protrusion 125 between the turntable 304 or the high/low rack 102a/102b and the heating element 122, and accordingly, the heating element 122 can be heated more intensively, as shown in FIG. 5E.

The lid 140 may be made of a material such as glass so that microwaves penetrate the lid 140 to arrive at a cooking material.

The vessel main body 110 according to the current embodiment may maintain high temperature of about 200° C. at the bottom through the heating element 122, upon cooking according to a simmer cooking command. Also, the cooking material may be heated by microwaves penetrated the lid 140. Also, since the vessel main body 110 is made of a metal material to reflect microwaves, microwaves reflected from the vessel main body 110 may be absorbed in the heating element 122, or may penetrate the lid 140 to heat the cooking material, as shown in FIG. 5E. That is, since the cooking material contained in the vessel main body 110 is heated intensively by microwaves on its lower and upper surfaces, the cooking vessel 100 according to the current embodiment can reduce cooking time, while providing an environment suitable for typical boiling using a pot or a caldron.

Also, the cooking vessel 100 according to the current embodiment may include the tray 121 for steam cooking, so that a user can perform steam cooking using the cooking vessel 100. The tray 121 may include a plurality of steam holes 123 having a predetermined shape and size and arranged at predetermined intervals. Also, the tray 121 may include a supporting portion 124 formed on the bottom to be spaced from the bottom of the cooking vessel 100 when the tray 121 is installed in the cooking vessel 100. If water contained in the vessel main body 120 is heated by microwaves to generate steam, the steam may pass through the steam holes 123 to perform steam cooking. Also, when cooking is performed using a pot or a caldron, a pre-process of stir-frying cooking materials is generally performed. Since the cooking vessel 100 according to the current embodiment can maintain the bottom at high temperature, the cooking vessel 100 can perform the pre-process. A user may put a cooking material in the vessel main body 110, close the lid 140, put the cooking vessel 100 into the cooking room 305 of the cooking apparatus 300, and then select the simmer cooking function provided by the cooking apparatus 300, thereby performing simmer cooking. The user may press the simmer cooking button 311b of the control panel 310 to select the simmer cooking function. The cooking apparatus 300 according to the current embodiment may include the simmer cooking button 311b on the control panel 310 to enable the user to perform simmer cooking using the cooking vessel 100. Hereinafter, a method of controlling the cooking apparatus 300 to perform an optimal simmer cooking function using the cooking vessel 100 when a simmer cooking command is input through the simmer cooking button 311b will be described in detail.

Figure 6:
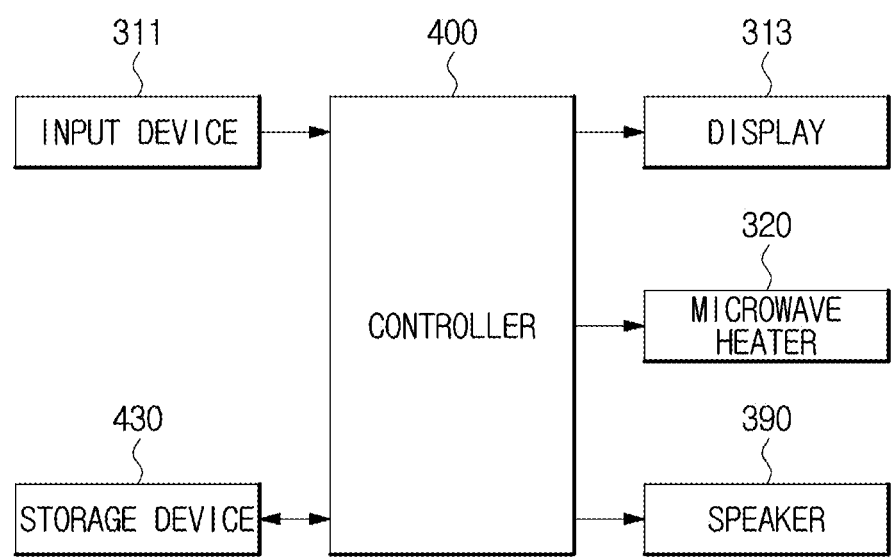
FIG. 6 is a control block diagram of a cooking apparatus according to an embodiment.
Figure 7:
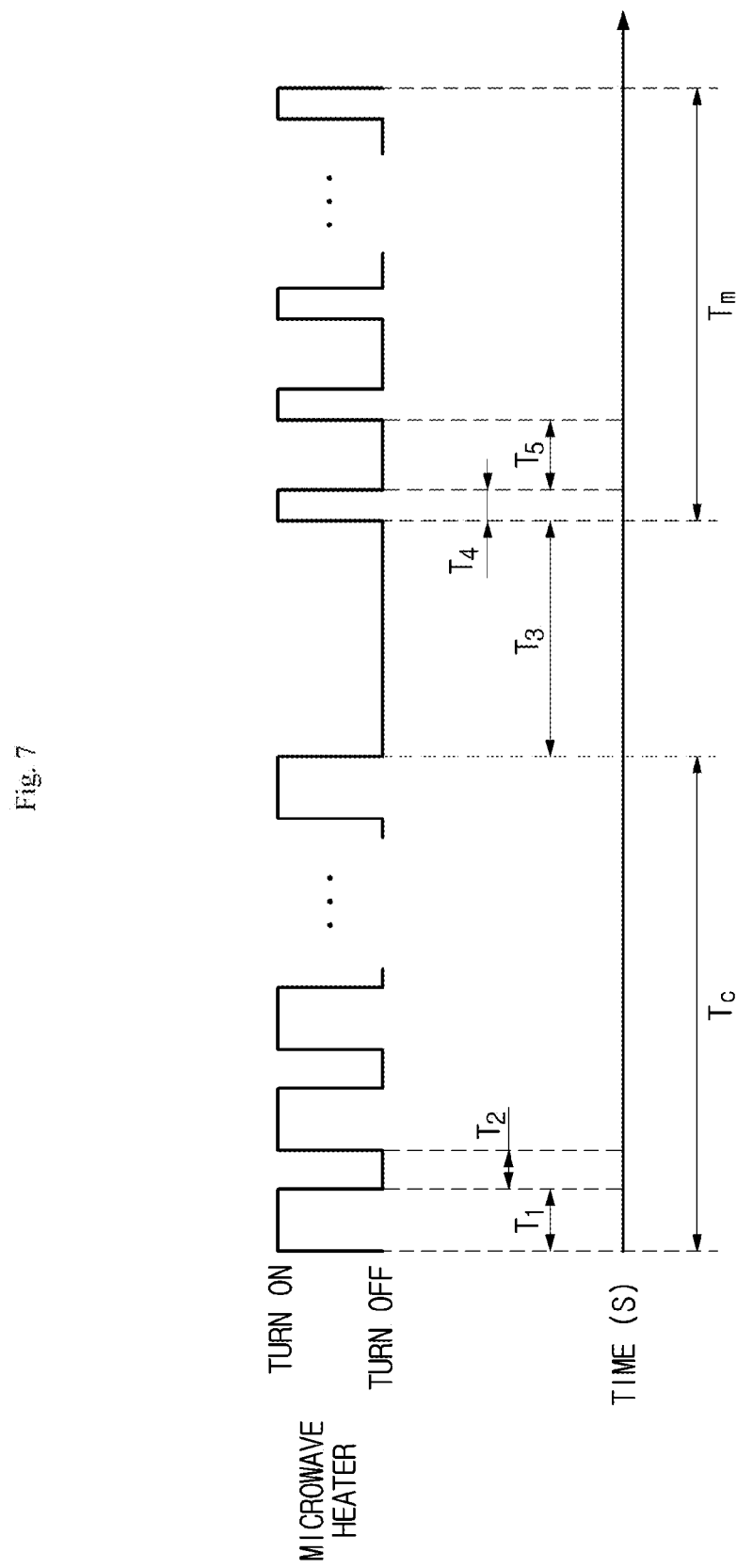
FIG. 7 is a graph showing time at which a microwave heater operates to perform a pot cooking function of a cooking apparatus according to an embodiment.

FIG. 6 is a control block diagram of a cooking apparatus according to an embodiment, and FIG. 7 is a graph showing time at which a microwave heater operates to perform a pot cooking function of a cooking apparatus according to an embodiment.

Referring to FIG. 6, the cooking apparatus 300 may include the simmer cooking button 311b, and include the input device 311 for receiving a simmer cooking command when the simmer cooking button 311b is selected, the microwave heater 320 for radiating microwaves to the cooking room 305, the display 313 for displaying an operation state of the cooking apparatus 300, a speaker 390 for informing a user of an operation state (for example, the elapse of cooking time) of the cooking apparatus 300 through sound, a controller 400 for controlling the display 313, the microwave heater 320, or the speaker 390 in correspondence to a simmer cooking command input through the input device 311, and a storage device 430 for storing operation data corresponding to the simmer cooking function and providing operation data to the controller 400 in response to a request for operation data from the controller 400.

If the user presses the simmer cooking button 311b of the input device 311 to input a simmer cooking command, the controller 400 may operate the microwave heater 320. Simmer cooking may be performed by the grill heating portion 330 or the convection heating portion 342, as well as the microwave heater 320. However, the microwave heater 320 is more suitable for simmer cooking since it can heat a cooking material to a desired state in a shortest amount of time. Hereinafter, simmer cooking by the microwave heater 320 will be described as an example. The controller 400 may operate the microwave heater 320 to radiate microwaves of a predetermined power (for example, 600 W). If the microwave heater 320 radiates microwaves toward the cooking vessel 100 placed in the cooking room 305, the heating element 122 absorbing the microwaves and the microwaves penetrated the lid 140 of the cooking vessel 100 may heat the cooking material put in the main body 110 of the cooking vessel 100 to perform simmer cooking.

Hereinafter, the operation of the microwave heater 320 when the simmer cooking function is performed will be described in detail with reference to FIG. 7. As shown in FIG. 7, if a simmer cooking command is input, the microwave heater 320 may be turned on. Also, the controller 400 may display an object informing that a simmer cooking function is being performed in response to the simmer cooking command, on the display 313. The display 313 may display a first object informing that simmer cooking is being performed, under the control of the controller 400. The first object may include text informing that simmer cooking is being performed, or an icon designed for a user to intuitively recognize that simmer cooking is being performed. However, the first object is not limited to text or an icon, and may include various interfaces that can be displayed on the display 313 in order for a user to be able to intuitively recognize that simmer cooking is being performed. The display 313 may display the first object including the text or the icon for a cooking time period $T_c$.

Also, the controller 400 may output first start sound informing that the simmer cooking function starts in response to the simmer cooking command, through the speaker 390. The controller 400 may control the operation of the speaker 390 to output start sound informing that the simmer cooking function starts, while displaying the object informing that the simmer cooking function is being performed, on the display 313.

When a first time period $T_1$ elapses after the microwave heater 320 is turned on, the controller 400 may turn off the microwave heater 320. That is, the controller 400 may operate the microwave heater 320 for the first time period $T_1$, and when the first time period $T_1$ elapses, the controller 400 may stop the microwave heater 320 for a second time period $T_2$. The first time period $T_1$ may have been decided in advance as time taken for a cooking material put in the cooking vessel 100 to arrive at temperature suitable for simmer cooking and then be maintained at the temperature, and then stored in the storage device 430. Also, the second time period $T_2$ may have been decided in advance as maintenance time of the temperature suitable for simmer cooking, and then stored in the storage device 430. For example, if a simmer cooking command is input, and simmer cooking "Borsch" of Russia is selected, the controller 400 may operate the microwave heater 320 with an output power of 800 W for 48 minutes which is a cooking time period $T_c$, in such a way to repeatedly perform a process of turning on the microwave heater 320 for 18 seconds which is the first time period $T_1$ and then turning off the microwave heater 320 for 12 seconds which is the second time period $T_2$. If another simmer cooking is selected, the controller 400 may apply another output power, another cooking time period, another first time period, and another second time period.

As shown in FIG. 7, the controller 400 may repeatedly perform a process of turning on and then turning off the microwave heater 320 for a cooking time period $T_c$ according to a simmer cooking command. While simmer cooking is performed, the cooking vessel 100 may be maintained at temperature suitable for the simmer cooking on the bottom by the heating element 122, and the cooking time period $T_c$ can be reduced by microwaves penetrated the lid 140, as described above.

When the cooking time period $T_c$ according to the simmer cooking command elapses, the controller 400 may make the first object flickering and then not display the first object on the display 313, or may output first sound informing that cooking is completed, through the speaker 390. The first sound may include signal sound that is different from the first start sound, or a human's voice.

If the user recognizes completion of simmer cooking through the display 313 or the speaker 390, and opens the door 303 to put the cooking vessel 100, the controller 400 may sense opening of the door 303, and finish the simmer cooking without performing a keeping-warm process. More specifically, if the cooking time period $T_c$ elapses, and the door 303 opens in a third time period $T_3$, the controller 400 may finish the simmer cooking without performing a keeping-warm process. However, if the controller 400 fails to recognize opening of the door 303 in the third time period $T_3$, the controller 400 may perform a keeping-warm process for maintaining the temperature of the cooking material, although no keeping-warm command is received. If a general cooking process provided by the cooking apparatus 300 accompanies an automatic keeping-warm process, there may be generated a problem that water contained in a cooking material is reduced gradually during the keeping-warm process so that the cooking material gets dry. Accordingly, an automatic keeping-warm function may be not suitable for the general cooking process. However, since simmer cooking according to the current embodiment contains sufficient water, a cooking material can be maintained at appropriate temperature without getting dry, although an automatic keeping-warm function is performed when the door 303 does not open in the third time period $T_3$.

During the keeping-warm process, the controller 400 may control the microwave heater 320 to operate with a power that is lower than the power of the microwave heater 320 during the cooking process. The reason is because during the cooking process, heating a cooking material is important, while during the keeping-warm process, maintaining the temperature of a cooking material is important.

If the controller 400 fails to sense opening of the door 303 in the third time period $T_3$, the controller 400 may again turn on the microwave heater 320. Then, the controller 400 may display a second object informing that a keeping-warm process starts, on the display 313. The display 313 may display the second object informing that a keeping-warm process is being performed, under the control of the controller 400. The second object may include text informing that keeping-warm is being performed, or an icon designed for a user to intuitively recognize that keeping-warm is being performed. The second object is not limited to text or an icon, and may include various interfaces that can be displayed on the display 313 for a user to be able to intuitively recognize that keeping-warm is being performed. The display 313 may display the second object including the text or the icon for a keeping-warm time period $T_m$. The first object and the second object described above may have been decided in advance, and then stored in the storage device 430.

Also, the controller 400 may output second start sound informing that a keeping-warm process starts, through the speaker 390. The controller 400 may control the operation of the speaker 390 to output second start sound informing that the keeping-warm function starts, while displaying the object informing that the keeping-warm function is being performed, on the display 313.

The third time period $T_3$ may have been set in advance as a time period for which the temperature of the cooking material does not fall below predetermined temperature, and stored.

When a fourth time period $T_4$ elapses after the microwave heater 320 is turned on, the controller 400 may turn off the microwave heater 320. That is, the controller 400 may operate the microwave heater 320 for the fourth time period $T_4$, and when the fourth time period $T_4$ elapses, the controller 400 may stop the microwave heater 320 for a fifth time period $T_5$. The fourth time period $T_4$ may have been decided in advance as a time period required for preventing the temperature of the cooking material contained in the cooking vessel 100 from falling below the predetermined temperature, and stored in the storage device 430. The fifth time period $T_5$ may also have been decided in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating a cooking material is important. Meanwhile, during the keeping-warm time period $T_m$, the fourth time period $T_4$ for which the microwave heater 320 is turned on may be set to be shorter than the fifth time period $T_5$ for which the microwave heater 320 is turned off, since maintaining the cooking material at the predetermined temperature is important.

As shown in FIG. 7, the controller 400 may repeatedly turn on and off the microwave heater 320 for the keeping-warm time period $T_m$.

When the keeping-warm time period $T_m$ elapses, the controller 400 may make the second object flickering and then not display the second object on the display 313, or may output second sound informing that the keeping-warm process has finished, through the speaker 390. The second sound may be signal sound that is different from the second start sound, or a human's voice.

That is, the cooking apparatus 300 according to the current embodiment may perform a keeping-warm process automatically when a simmer cooking command is received and a predetermined condition described above is satisfied, although no keeping-warm command is received, thereby maintaining the cooking material at optimal temperature.

Figure 8:
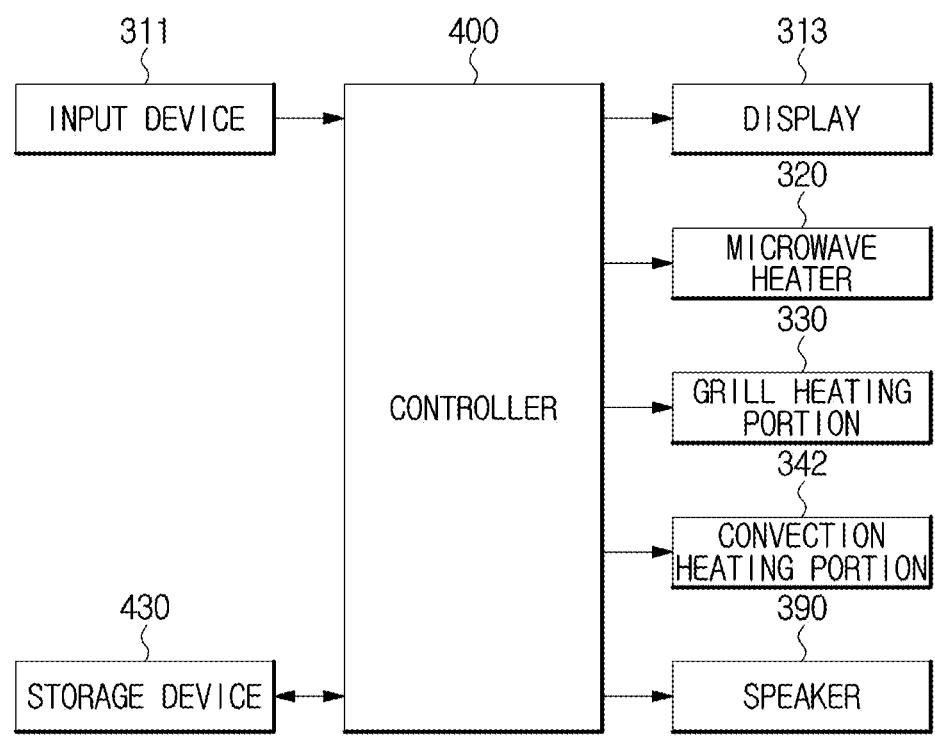
FIG. 8 is a control block diagram of a cooking apparatus according to another embodiment.
Figure 9B:
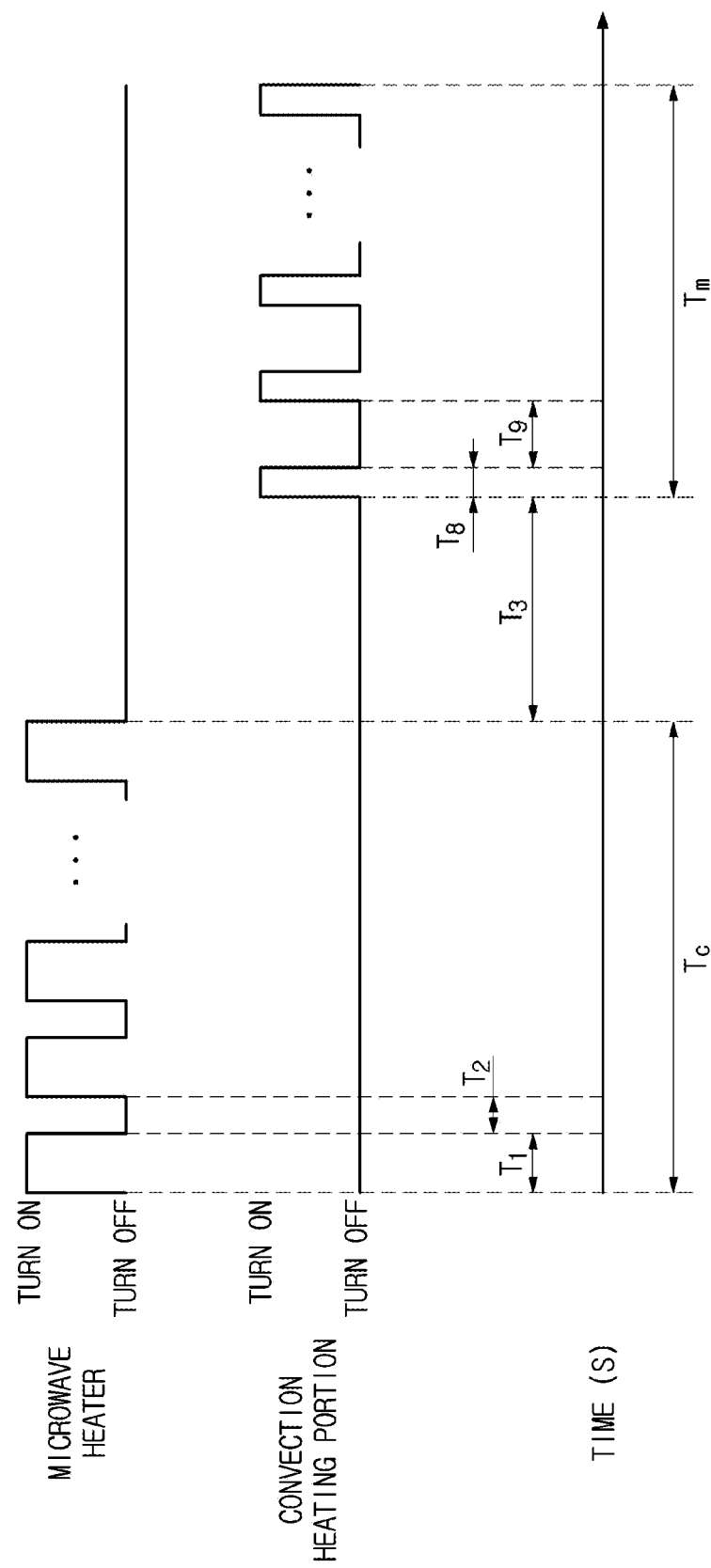
FIG. 9B is a graph showing time at which a microwave heater and a convection heating portion operate to perform a simmer cooking function of a cooking apparatus according to still another embodiment.

FIG. 8 is a control block diagram of a cooking apparatus according to another embodiment, FIG. 9A is a graph showing time at which a microwave heater and a convection heating portion operate to perform a simmer cooking function of the cooking apparatus according to the other embodiment, and FIG. 9B is a graph showing time at which a microwave heater and a convection heating portion operate to perform a simmer cooking function of a cooking apparatus according to still another embodiment.

Referring to FIG. 8, the cooking apparatus 300 may include the simmer cooking button 311b, and include the input device 311 for receiving a simmer cooking command when the simmer cooking button 311b is selected, the microwave heater 320 for radiating microwaves to the cooking room 305, the grill heating portion 330 for radiating radiant heat to the cooking room 305, the convection heating portion 342 for generating hot air to heat a cooking material, the display 313 for displaying an operation state of the cooking apparatus 300, the speaker 390 for informing a user of an operation state (for example, the elapse of cooking time) of the cooking apparatus 300 through sound, the controller 400 for controlling the display 313, the microwave heater 320, the grill heating portion 330, the convection heating portion 342, or the speaker 390 in correspondence to a simmer cooking command input through the input device 311, and the storage device 430 for storing operation data corresponding to the simmer cooking function and providing operation data to the controller 400 in response to a request for operation data from the controller 400.

When a user presses the simmer cooking button 311b of the input device 311 to input a simmer cooking command, the controller 400 may operate the microwave heater 320. The controller 400 may operate the microwave heater 320 to radiate microwaves with a predetermined power (for example, 600 W). If the microwave heater 320 radiates microwaves to the cooking vessel 100 placed in the cooking room 305, the heating element 122 absorbing the microwaves and the microwaves penetrated the lid 140 of the cooking vessel 100 may heat a cooking material put in the main body 110 of the cooking vessel 100 to perform simmer cooking.

Operations of the microwave heater 320 before the third time period $T_3$ are the same as those of the microwave heater 320 described above with reference to FIG. 7, and accordingly, detailed descriptions thereof will be omitted.

If the controller 400 fails to sense opening of the door 303 in the third time period $T_3$, the controller 400 may turn on the grill heating portion 330, as shown in FIG. 9A. Or, the controller 400 may turn the convection heating portion 342, as shown in FIG. 9B. Then, the controller 400 may display the second object informing that a keeping-warm process starts, on the display 313. The display 313 may display the second object informing that a keeping-warm process is being performed, under the control of the controller 400. The second object may include text informing that keeping-warm is being performed, or an icon designed for a user to intuitively recognize that keeping-warm is being performed. The second object is not limited to text or an icon, and may include various interfaces that can be displayed on the display 313 for a user to be able to intuitively recognize that keeping-warm is being performed. The display 313 may display the second object including the text or the icon for a keeping-warm time period $T_m$. The first object and the second object as described above may have been decided in advance, and then stored in the storage device 430.

Also, the controller 400 may output second start sound informing that a keeping-warm process starts, through the speaker 390. The controller 400 may control the operation of the speaker 390 to output second start sound informing that the keeping-warm function starts, while displaying the object informing that the keeping-warm function is performed on the display 313.

The third time period $T_3$ may have been set in advance as a time period for which the temperature of the cooking material does not fall below the predetermined temperature, and stored.

When a sixth time period $T_6$ elapses after the grill heating portion 330 is turned on, the controller 400 may turn off the grill heating portion 330, as shown in FIG. 9A. That is, the controller 400 may operate the grill heating portion 330 for the sixth time period $T_6$, and then when the sixth time period $T_6$ elapses, the controller 400 may stop the grill heating portion 330 for a seventh time period $T_7$. The sixth time period $T_6$ may have been set in advance as a time period required for preventing the temperature of the cooking material contained in the cooking vessel 100 from falling below the predetermined temperature, and stored in the storage device 430. The seventh time period $T_7$ may also have been set in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating the cooking material is important. Meanwhile, during the keeping-warm time period $T_m$, the sixth time period $T_6$ for which the grill heating portion 330 is turned on may be set to be shorter than the seventh time period $T_7$ for which the grill heating portion 330 is turned off, since maintaining the cooking material at the predetermined temperature is important.

When an eighth time period $T_8$ elapses after the convection heating portion 342 is turned on, the controller 400 may turn off the convection heating portion 342, as shown in FIG. 9B. That is, the controller 400 may operate the convection heating portion 342 for the eighth time period $T_8$, and when the eighth time period $T_8$ elapses, the controller 400 may stop the convection heating portion 342 for a ninth time period $T_9$. The eighth time period $T_8$ may have been set in advance as a time period required for preventing the temperature of the cooking material contained in the cooking vessel 100 from falling below the predetermined temperature, and stored in the storage device 430. The ninth time period $T_9$ may also have been set in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating the cooking material is important. Meanwhile, during the keeping-warm time period $T_m$, the eighth time period $T_8$ for which the convection heating portion 342 is turned on may be set to be shorter than the ninth time period $T_9$ for which the convection heating portion 342 is turned off, since maintaining the cooking material at the predetermined temperature is important.

As shown in FIGS. 9A and 9B, the controller 400 may repeatedly turn on and off the grill heating portion 330 or the convection heating portion 342, for the keeping-warm time period $T_m$.

When the keeping-warm time period $T_m$ elapses, the controller 400 may make the second object flickering and then not display the second object on the display 313, or may output second sound informing that the keeping-warm process has finished, through the speaker 390. The second sound may be signal sound that is different from the second start sound, or a human's voice.

That is, the cooking apparatus 300 according to the current embodiment may perform a keeping-warm process automatically when a simmer cooking command is received and a predetermined condition described above is satisfied, although no keeping-warm command is received, thereby maintaining the cooking material at optimal temperature.

Figure 10:
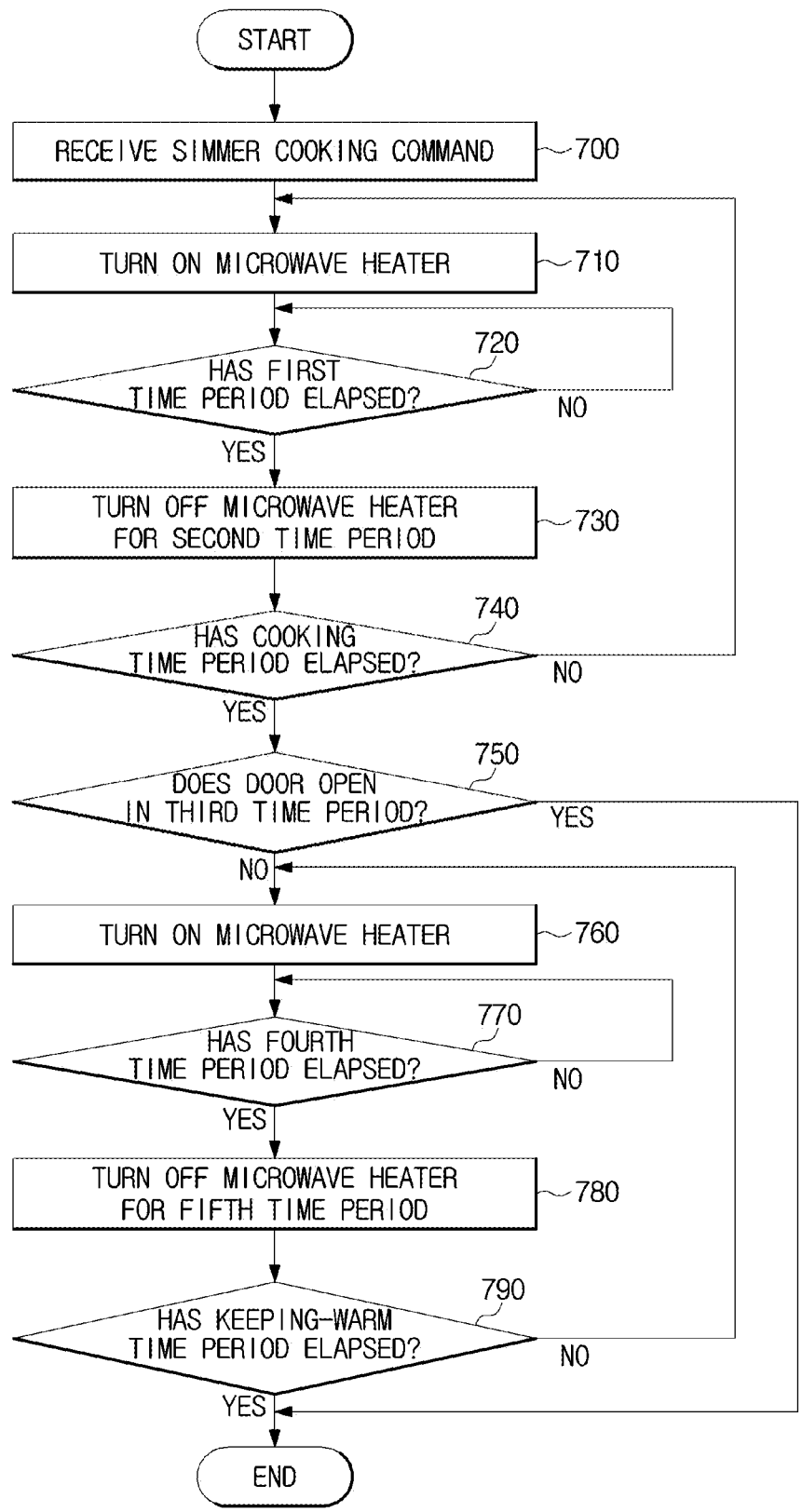
FIG. 10 is a flowchart illustrating a method of controlling a cooking apparatus according to an embodiment.

FIG. 10 is a flowchart illustrating a method of controlling a cooking apparatus according to an embodiment.

Referring to FIG. 10, when a simmer cooking command is received in operation 700, the controller 400 may turn on the microwave heater 320 in operation 710. When a first time period $T_1$ elapses in operation 720, the controller 400 may turn off the microwave heater 320 for a second time period $T_2$ in operation 730.

That is, when a simmer cooking command is received, the controller 400 may turn on the microwave heater 320. When a first time period $T_1$ elapses after the microwave heater 320 is turned on, the controller 400 may turn off the microwave heater 320. That is, the controller 400 may operate the microwave heater 320 for the first time period $T_1$, and when the first time period $T_1$ elapses, the controller 400 may turn off the microwave heater 320 for the second time period $T_2$. The first time period $T_1$ may have been decided in advance as time taken for a cooking material put in the cooking vessel 100 to arrive at temperature suitable for simmer cooking and then be maintained at the temperature, and then stored in the storage device 430. Also, the second time period $T_2$ may have been decided in advance as maintenance time of the temperature suitable for the simmer cooking, and then stored in the storage device 430. As shown in FIG. 7, the controller 400 may repeatedly turn on and off the microwave heater 320 for a cooking time period $T_c$ according to the simmer cooking command. While simmer cooking is performed, the cooking vessel 100 may be maintained at temperature suitable for the simmer cooking on the bottom by the heating element 122, and the cooking time period $T_c$ can be reduced by microwaves penetrated the lid 140, as described above.

If the door 303 does not open in a third time period $T_3$ in operation 750 after the cooking time period $T_c$ elapses in operation 740, the controller 400 may turn on the microwave heater 320 in operation 760. Thereafter, when a fourth time period $T_4$ elapses in operation 770, the controller 400 may turn off the microwave heater 320 for a fifth time period $T_5$ in operation 780. Thereafter, when a keeping-warm time period $T_m$ elapses, the controller 400 may finish the keeping-warm process in operation 790.

If a user opens the door 303 to take the cooking vessel 100 after the cooking time period $T_c$ according to the simmer cooking command elapses, the controller 400 may sense opening of the door 303, and finish the simmer cooking without performing a keeping-warming process. More specifically, if the cooking time period $T_c$ elapses and the door 303 opens in the third time period $T_3$, the controller 400 may finish the simmer cooking without performing a keeping-warm process. However, when the controller 400 fails to sense opening of the door 303 in the third time period $T_3$, the controller 400 may perform a keeping-warm process for maintaining the temperature of the cooking material although no keeping-warm command is received.

If the controller 400 fails to sense opening of the door 303 in a third time period $T_3$, the controller 400 may again turn on the microwave heater 320. The third time period $T_3$ may have been set in advance as a time period for which the temperature of the cooking material does not fall below the predetermined temperature, and stored.

When a fourth time period $T_4$ elapses after the microwave heater 320 is turned on, the controller 400 may turn off the microwave heater 320. That is, the controller 400 may operate the microwave heater 320 for the fourth time period $T_4$, and when the fourth time period $T_4$ elapses, the controller 400 may stop the microwave heater 320 for a fifth time period $T_5$. The fourth time period $T_4$ may have been decided in advance as a time period required for preventing the temperature of the cooking material contained in the cooking vessel 100 from falling below the predetermined temperature, and stored in the storage device 430. The fifth time period $T_5$ may also have been decided in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating the cooking material is important. Meanwhile, during the keeping-warm time period $T_m$, the fourth time period $T_4$ for which the microwave heater 320 is turned on may be set to be shorter than the fifth time period $T_5$ for which the microwave heater 320 is turned off, since maintaining the cooking material at the predetermined temperature is important.

As shown in FIG. 7, the controller 400 may repeatedly turn on and off the microwave heater 320 for the keeping-warm time period $T_m$.

Thereafter, when the keeping-warm time period $T_m$ elapses, the controller 400 may finish the keeping-warm process. That is, the cooking apparatus 300 according to the current embodiment may perform the keeping-warm process automatically when a simmer cooking command is received and a predetermined condition described above is satisfied, although no keeping-warm command is received, thereby maintaining the cooking material at optimal temperature.

Figure 11:
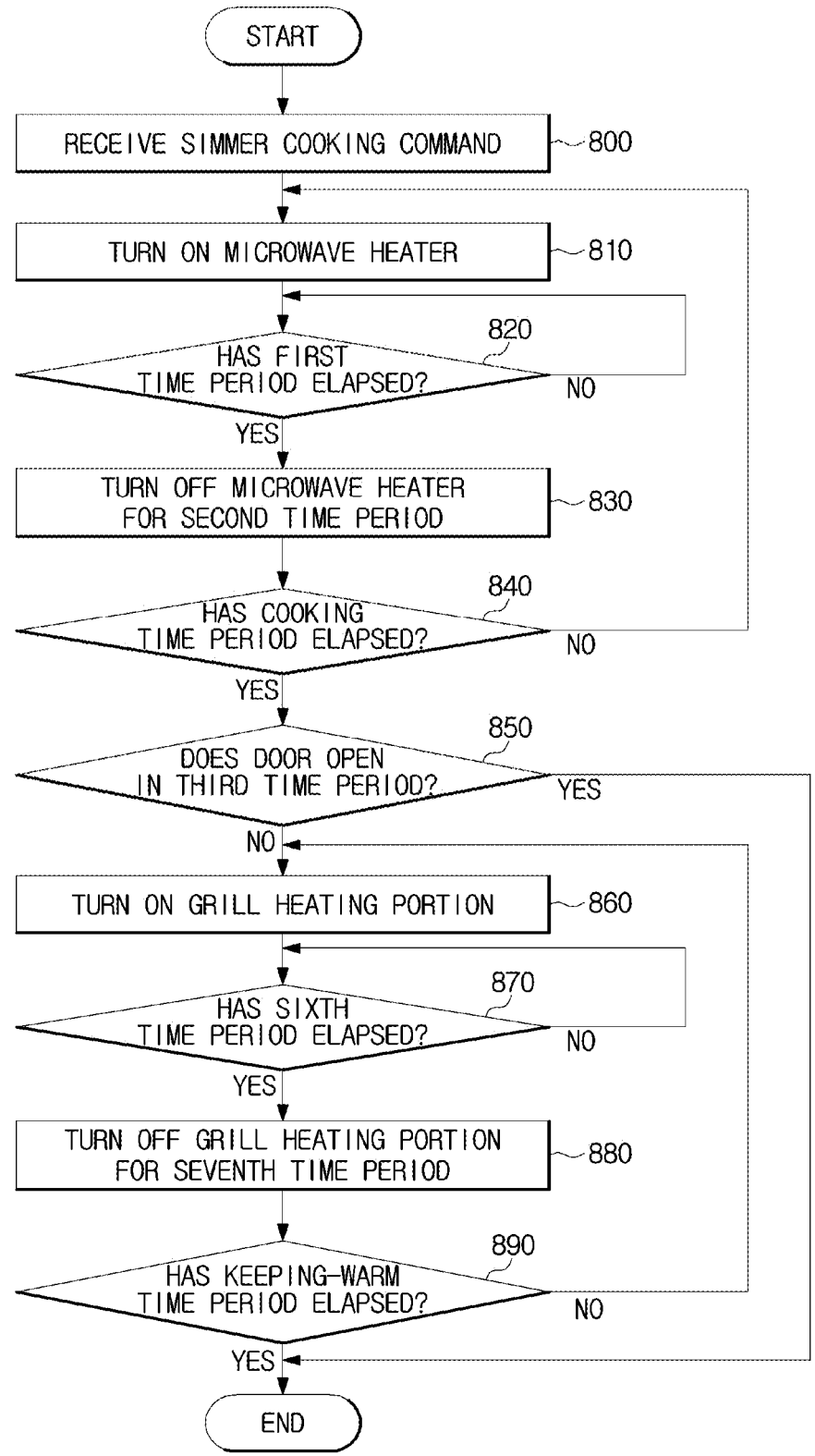
FIG. 11 is a flowchart illustrating a method of controlling a cooking apparatus according to another embodiment.

FIG. 11 is a flowchart illustrating a method of controlling a cooking apparatus according to another embodiment.

Referring to FIG. 11, when a simmer cooking command is received in operation 800, the controller 400 may turn on the microwave heater 320 in operation 810. Thereafter, when a first time period $T_1$ elapses in operation 820, the controller 400 may turn off the microwave heater 320 for a second time period $T_2$ in operation 830. The operations 800 to 830 may be the same as the operations 710 to 730 described above with reference to FIG. 10, and accordingly, detailed descriptions thereof will be omitted.

If the door 303 does not open in a third time period $T_3$ in operation 850 after a cooking time period $T_c$ elapses in operation 840, the controller 400 may turn on the grill heating portion 330 in operation 860. Thereafter, when a sixth time period $T_6$ elapses in operation 870, the controller 400 may turn off the grill heating portion 330 for a seventh time period $T_6$ in operation 880. Then, when a keeping-warm time period $T_m$ elapses, the controller 400 may finish the keeping-warm process in operation 890.

If a user opens the door 303 to take the cooking vessel 100 after the cooking time period $T_c$ according to the simmer cooking command elapses, the controller 400 may sense opening of the door 303, and finish simmer cooking without performing a keeping-warm process. More specifically, if the cooking time period $T_c$ elapses and the door 303 opens in the third time period $T_3$, the controller 400 may finish simmer cooking without performing a keeping-warm process. However, if the controller 400 fails to sense opening of the door 303 in the third time period $T_3$, the controller 400 may perform a keeping-warm process for maintaining the temperature of the cooking material, although no keeping-warm command is received.

If the controller 400 fails to sense opening of the door 303 in the third time period $T_3$, the controller 400 may again turn on the grill heating portion 330. The third time period $T_3$ may have been set in advance as a time period for which the temperature of the cooking material does not fall below the predetermined temperature, and stored.

When a sixth time period $T_6$ elapses after the grill heating portion 330 is turned on, the controller 400 may turn off the grill heating portion 330. That is, the controller 400 may operate the grill heating portion 330 for the sixth time period $T_6$, and then when the sixth time period $T_6$ elapses, the controller 400 may stop the grill heating portion 330 for a seventh time period $T_7$. The sixth time period $T_6$ may have been set in advance as a time period required for preventing the temperature of the cooking material contained in the cooking vessel 100 from falling below the predetermined temperature, and stored in the storage device 430. The seventh time period $T_7$ may also have been set in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating the cooking material is important. Meanwhile, during the keeping-warm time period $T_m$, the sixth time period $T_6$ for which the grill heating portion 330 is turned on may be set to be shorter than the seventh time period $T_7$ for which the grill heating portion 330 is turned off, since maintaining the cooking material at the predetermined temperature is important.

As shown in FIG. 9B, the controller 400 may repeatedly turn on and off the grill heating portion 330, for the keeping-warm time period $T_m$.

When the keeping-warm time period $T_m$ elapses, the controller 400 may finish the keeping-warm process. That is, the cooking apparatus 300 according to the current embodiment may perform a keeping-warm process automatically when a simmer cooking command is received and a predetermined condition described above is satisfied, although no keeping-warm command is received, thereby maintaining the cooking material at optimal temperature.

Figure 12:
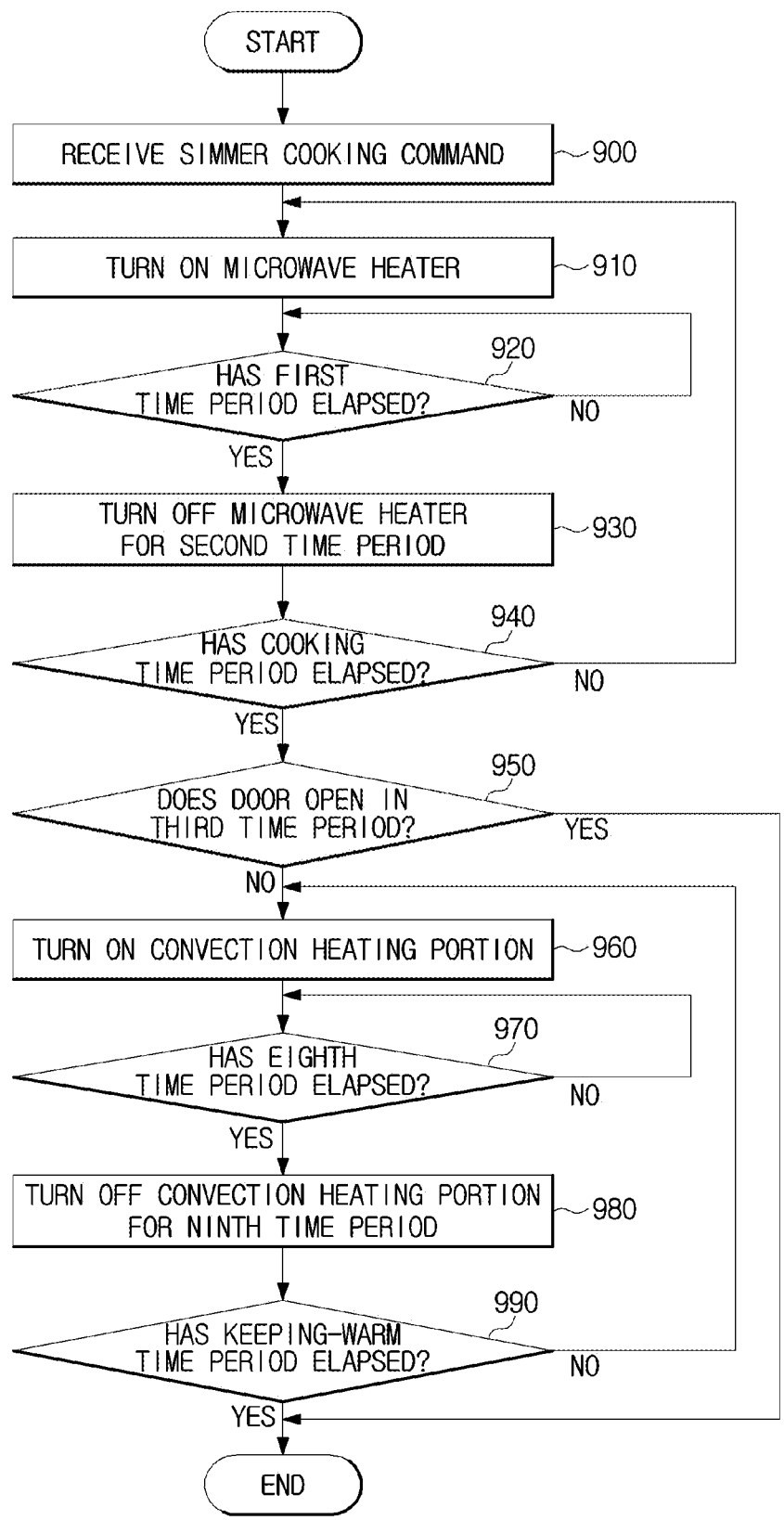
FIG. 12 is a flowchart illustrating a method of controlling a cooking apparatus according to another embodiment.

FIG. 12 is a flowchart illustrating a method of controlling a cooking apparatus according to another embodiment.

Referring to FIG. 12, if a simmer cooking command is received in operation 900, the controller 400 may turn on the microwave heater 320 in operation 910, and when a first time period $T_1$ elapses, the controller 400 may turn off the microwave heater 320 for a second time period $T_2$ in operation 930. If the door 303 does not open in a third time period $T_3$ in operation 950 after a cooking time period $T_c$ elapses in operation 940, the controller 400 may turn on the convection heating portion 342 in operation 960. Thereafter, when an eight time period $T_8$ elapses in operation 970, the controller 400 may turn off the convection heating portion 342 for a ninth time period $T_9$ in operation 980. Then, when a keeping-warm time period $T_m$ elapses in operation 990, the controller 400 may finish a keeping-warm process. The operations 900 to 930 may be the same as the operations 700 to 730 described above with reference to FIG. 10, and accordingly, detailed descriptions thereof will be omitted.

If a user opens the door 303 to take the cooking vessel 100 after the cooking time period $T_c$ according to the simmer cooking command elapses, the controller 400 may sense opening of the door 303, and finish simmer cooking without performing a keeping-warm process. More specifically, when the cooking time period $T_c$ elapses and the door 303 opens in the third time period $T_3$, the controller 400 may finish simmer cooking without performing a keeping-warm process. However, if the controller 400 fails to sense opening of the door 303 in the third time period $T_3$, the controller 400 may perform a keeping-warm process for maintaining the temperature of a cooking material, although no keeping-warm command is received.

If the controller 400 fails to sense opening of the door 303 in the third time period $T_3$, the controller 400 may turn on the convection heating portion 342. The third time period $T_3$ may have been set in advance as a time period for which the temperature of the cooking material does not fall below predetermined temperature, and stored.

If an eighth time period $T_8$ elapses after the convection heating portion 342 is turned on, the controller 400 may turn off the convection heating portion 342. That is, the controller 400 may operate the convection heating portion 342 for the eighth time period $T_8$, and stop the convection heating portion 342 for a ninth time period $T_9$ after the eighth time period $T_8$ elapses. The eighth time period $T_8$ may have been set in advance as a time period required for preventing the temperature of the cooking material contained in the cooking vessel 100 from falling below the predetermined temperature, and stored in the storage device 430. The ninth time period $T_9$ may also have been set in advance as a time period for which the temperature of the cooking material does not fall below the predetermined temperature, and stored in the storage device 430. During the cooking time period $T_c$, the first time period $T_1$ for which the microwave heater 320 is turned on may be longer than the second time period $T_2$ for which the microwave heater 320 is turned off, since heating the cooking material is important. Meanwhile, during the keeping-warm time period $T_m$, the eighth time period $T_8$ for which the convection heating portion 342 is turned on may be set to be shorter than the ninth time period $T_9$ for which the convection heating portion 342 is turned off, since maintaining the cooking material at the predetermined temperature is important.

As shown in FIG. 9B, the controller 400 may repeatedly turn on and off the grill heating portion 330 for the keeping-warm time period $T_m$.

When the keeping-warm time period $T_m$ elapses, the controller 400 may finish the keeping-warm process. That is, the cooking apparatus 300 according to the current embodiment may perform a keeping-warm process automatically when a simmer cooking command is received and a predetermined condition described above is satisfied, although no keeping-warm command is received, thereby maintaining the cooking material at optimal temperature.

While the present disclosure has been particularly described with reference to exemplary embodiments, it should be understood by those of skilled in the art that various changes in form and details may be made without departing from the spirit and scope of the present disclosure.

The cooking apparatus and the control method thereof as described above have industrial applicability since they can be used at home or in various industrial fields.

The invention claimed is:
1. A cooking apparatus comprising:
a cooking room which is configured to accommodate a cooking vessel;
a microwave heater configured to radiate microwaves to the cooking vessel;
at least one of a grill heating portion and a convection heating portion, wherein the grill heating portion is configured to supply radiant heat to the cooking room, and wherein the convection heating portion is configured to supply hot air to the cooking room;
an input device configured to receive a simmer cooking command; and
a controller configured to:
repeatedly perform, for a cooking time period, a process of:
turning on the microwave heater for a first time period when the simmer cooking command is received through the input device, and
turning off the microwave heater for a second time period when the first time period elapses,
recognize whether a door of the cooking apparatus opens in a third time period after the cooking time period elapses, and
repeatedly turn on and off the grill heating portion or the convection heating portion to perform a keeping-warm process in response to recognizing that the door does not open in the third time period, wherein, during the keeping-warm process, the controller is configured to turn on the grill heating portion or the convection heating portion for a shorter period of time than it is configured to turn off the grill heating portion or the convection heating portion,
wherein the third time period is a time period for which a temperature of a cooking material does not fall below predetermined temperature.

2. The cooking apparatus of claim 1, further comprising a display configured to display information related to cooking,
wherein:
when the simmer cooking command is received, the display is configured to display a first object informing that a simmer cooking process is performed for the cooking time period, and
when the door does not open in the third time period after the cooking time period elapses, the display is configured to display a second object informing that the keeping-warm process is performed.

3. The cooking apparatus of claim 1, further comprising a speaker configured to output sound related to cooking,
wherein:
when the cooking time period elapses, the speaker is configured to output a first sound informing that the cooking time period has elapsed, and
when a keeping-warm time period elapses, the speaker is configured to output a second sound informing that the keeping-warm time period has elapsed.

4. The cooking apparatus of claim 1, wherein when the keeping-warm process is performed, the controller is further configured to drive the microwave heater with an output power that is lower than an output power of the microwave heater during the first time period.

5. The cooking apparatus of claim 1, wherein, during the keeping-warm process, the controller is further configured to repeatedly perform, for a keeping-warm time period, a process of:
turning on the microwave heater for a fourth time period, and
turning off the microwave heater for a fifth time period when the fourth time period elapses, wherein the fifth time period is longer than the fourth time period.

6. The cooking apparatus of claim 1, wherein, during the keeping-warm process, the controller is further configured to repeatedly perform, for a keeping-warm time period, a process of:
turning on the grill heating portion for a sixth time period, and
turning off the grill heating portion for a seventh time period when the sixth time period elapses.

7. The cooking apparatus of claim 1, wherein, during the keeping-warm process, the controller is further configured to repeatedly perform, for a keeping-warm time period, a process of:
turning on the convection heating portion for an eighth time period, and
turning off the convection heating portion for a ninth time period when the eighth time period elapses.

8. The cooking apparatus of claim 1, wherein a heating element is made of a ferrite-rubber compound.

9. A method of controlling a cooking apparatus, the cooking apparatus including a cooking room configured to accommodate a cooking vessel, a microwave heater configured to radiate microwaves to the cooking vessel, and an input device configured to receive a simmer cooking command, at least one of a grill heating portion and a convection heating portion, wherein the grill heating portion is configured to supply radiant heat to the cooking room, and wherein the convection heating portion is configured to supply hot air to the cooking room, the method comprising:
turning on the microwave heater for a first time period when the simmer cooking command is received through the input device;
turning off the microwave heater for a second time period when the first time period elapses;
repeatedly performing a process of turning on and off the microwave heater for a cooking time period;
recognizing whether a door of the cooking apparatus opens in a third time period after the cooking time period elapses; and
repeatedly turning on and off the grill heating portion or the convection heating portion to perform a keeping-warm process in response to recognizing that the door does not open in the third time period, wherein during the keeping-warm process the grill heating portion or the convection heating portion is turned on for a shorter period of time than the grill heating portion or the convection heating portion is turned off,
wherein the third time period is a time period for which a temperature of a cooking material does not fall below predetermined temperature.

10. The method of claim 9, wherein:
the cooking apparatus further including a display configured to display information related to cooking, and
the method further comprising:
displaying, at the display, a first object informing that a simmer cooking process is performed, for the cooking time period when the simmer cooking command is received through the input device; and
displaying, at the display, a second object informing that the keeping-warm process is performed if the door does not open in the third time period after the cooking time period elapses.

11. The method of claim 9, wherein the performing of the keeping-warm process comprises, when the keeping-warm process is performed, driving the microwave heater with an output power that is lower than an output power of the microwave heater during the first time period.

12. The method of claim 9, wherein the performing of the keeping-warm process comprises:
turning on the microwave heater for a fourth time period if the door does not open in the third time period after the cooking time period elapses;
turning off the microwave heater for a fifth time period when the fourth time period elapses, wherein the fifth time period is longer than the fourth time period; and
repeatedly performing a process of turning on and off the microwave heater for a keeping-warm time period.

13. The method of claim 9, wherein the performing of the keeping-warm process comprises:
turning on the grill heating portion for a sixth time period if the door does not open in the third time period after the cooking time period elapses;
turning off the grill heating portion for a seventh time period when the sixth time period elapses, wherein the seventh time period is longer than the sixth time period; and
repeatedly performing a process of turning on and off the grill heating portion for a keeping-warm time period.

14. The method of claim 9, wherein the performing of the keeping-warm process comprises:
turning on the convection heating portion for an eighth time period if the door does not open in the third time period after the cooking time period elapses;
turning off the convection heating portion for a ninth time period when the eighth time period elapses, wherein the ninth time period is longer than the eighth time period; and
repeatedly performing a process of turning on and off the convection heating portion for a keeping-warm time period.

15. The method of claim 9, wherein:
the cooking apparatus further comprises a display configured to display information related to cooking, and
the performing of the keeping-warm process comprises, when the simmer cooking command is received, displaying, on the display, a first object informing that a simmer cooking process is performed for the cooking time period.

16. The method of claim 15, wherein the performing of the keeping-warm process further comprises, when the door does not open in the third time period after the cooking time period elapses, displaying, on the display, a second object informing that the keeping-warm process is performed.

17. The method of claim 9, wherein:
the cooking apparatus further comprises a speaker configured to output sound related to cooking; and
the performing of the keeping-warm process comprises, when the cooking time period elapses, outputting, on the speaker, a first sound informing that the cooking time period has elapsed.

18. The method of claim 17, wherein the performing of the keeping-warm process comprises, when a keeping-warm time period elapses, outputting, on the speaker, a second sound informing that the keeping-warm time period has elapsed.

* * * * *